(12) United States Patent
Kuribayashi

(10) Patent No.: US 11,557,076 B2
(45) Date of Patent: *Jan. 17, 2023

(54) COMPUTER GENERATED HAIR GROOM TRANSFER TOOL

(71) Applicant: Magic Leap, Inc., Plantation, FL (US)

(72) Inventor: Takashi Kuribayashi, Culver City, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,714

(22) Filed: Nov. 12, 2021

(65) Prior Publication Data

US 2022/0076474 A1 Mar. 10, 2022

Related U.S. Application Data

(63) Continuation of application No. 17/051,730, filed as application No. PCT/US2019/033122 on May 20, 2019, now Pat. No. 11,210,835.

(60) Provisional application No. 62/675,006, filed on May 22, 2018.

(51) Int. Cl.
*G06T 19/00* (2011.01)
*G06T 13/40* (2011.01)
*G06T 17/20* (2006.01)

(52) U.S. Cl.
CPC .............. *G06T 13/40* (2013.01); *G06T 17/20* (2013.01); *G06T 19/006* (2013.01)

(58) Field of Classification Search
None
See application file for complete search history.

(56) References Cited

U.S. PATENT DOCUMENTS

| | | |
|---|---|---|
| 5,561,749 A | 10/1996 | Schroeder |
| 6,850,221 B1 | 2/2005 | Tickle |
| 7,348,973 B1 | 3/2008 | Gibbs et al. |
| 9,070,228 B2 | 6/2015 | Bruderlin et al. |
| 11,210,835 B2 | 12/2021 | Kuribayashi |
| 11,282,255 B2 | 3/2022 | Kuribayashi |
| 2006/0028436 A1 | 2/2006 | Armstrong |
| 2007/0081123 A1 | 4/2007 | Lewis |

(Continued)

FOREIGN PATENT DOCUMENTS

| | | |
|---|---|---|
| WO | WO 2017/148941 | 9/2017 |
| WO | WO 2019/226494 | 11/2019 |
| WO | WO 2019/226549 | 11/2019 |

OTHER PUBLICATIONS

International Search Report and Written Opinion, re PCT Application No. PCT/US2019/033122, dated Aug. 2, 2019.

(Continued)

*Primary Examiner* — Nicholas R Wilson
(74) *Attorney, Agent, or Firm* — Seed IP Law Group LLP

(57) ABSTRACT

A computer generated (CG) hair groom for a virtual character can include strand-based (also referred to as instanced) hair in which many thousands of digital strands represent real human hair strands. Embodiments of systems and methods for transferring CG hair groom data from a first (or source) virtual character to a second (or target) virtual character are provided. Some embodiments can factor in a difference between a hairline of the first virtual character and a hairline of the second virtual character to improve the overall appearance or fit of the hair groom on the second virtual character.

20 Claims, 20 Drawing Sheets

(56) References Cited

U.S. PATENT DOCUMENTS

| | | |
|---|---|---|
| 2007/0273685 A1 | 11/2007 | Bruderlin et al. |
| 2010/0066739 A1 | 3/2010 | Ishibashi |
| 2010/0299106 A1 | 11/2010 | Audoly et al. |
| 2011/0063291 A1 | 3/2011 | Yuksel |
| 2012/0127062 A1 | 5/2012 | Bar-Zeev et al. |
| 2012/0162549 A1 | 6/2012 | Gao et al. |
| 2012/0234146 A1 | 9/2012 | Lakin |
| 2012/0313937 A1 | 12/2012 | Beeler et al. |
| 2013/0021460 A1 | 1/2013 | Burdoucci |
| 2013/0082922 A1 | 4/2013 | Miller |
| 2013/0117377 A1 | 5/2013 | Miller |
| 2013/0121608 A1 | 5/2013 | Winnemoeller et al. |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0176565 A1 | 6/2014 | Adeyoola et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0123967 A1 | 5/2015 | Quinn et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0154993 A1 | 6/2016 | Aarabi |
| 2016/0247308 A1 | 8/2016 | Jiao et al. |
| 2017/0372505 A1 | 12/2017 | Bhat et al. |
| 2018/0374242 A1 | 12/2018 | Li et al. |
| 2019/0295272 A1 | 9/2019 | Aksit et al. |
| 2021/0158591 A1 | 5/2021 | Kuribayashi |
| 2021/0241510 A1 | 8/2021 | Kuribayashi |
| 2022/0157004 A1 | 5/2022 | Kuribayashi |

OTHER PUBLICATIONS

International Preliminary Report for Patentability, re PCT Application No. PCT/US2019/033122, dated Nov. 24, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Chai, et al., "Single-view hair modeling for portrait manipulation," ACM Transactions on Graphics (TOG), Aug. 2012.
Creating Characters in Uncharted 4 with Naughty Dog's Character Arts Team, CG Society, Jun. 1, 2016, https://www.youtube.com/watch?v=fgDv7njYUWU, in 5 pages.
Creating Polygon Hair for Game Characters, CG Cookie Unity, Apr. 29, 2013, https://www.youtube.com/watch?v=6Wi4-fdeYyM, in 7 pages.
GMH2, Maya Hair Plugin, Latest patch 2.6, Thunder Cloud Studio, http://thundercloud-studio.com/product/gmh2, in 11 pages, downloaded on Apr. 28, 2018.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Maya, "Convert XGen hair and fur to Maya geometry," May 10, 2016, autodesk.com, in 8 pages.
Maya, "UVs," 2017, autodesk.com, in 9 pages.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Wikipedia, "UV mapping," https://en.wikipedia.org/wiki/UV_mapping, in 3 pages, downloaded Apr. 28, 2018.
Jung, et al. "Real Time Rendering and Animation of Virtual Characters." IJVR, Jan. 2007, 6(4):55-66.
Pack Multiple Images of Different Sizes Into One Image (Python Recipe), in 2 pages, downloaded May 11, 2018. http://code.activestate.com/recipes/4422299/.
Perdeck, "Fast Optimizing Rectangle Packing Algorithm for Building CSS Sprites," Jun. 14, 2011. Code Project for those who code, in 16 pages. https://www.codeproject.com/Articles/210979/Fast-optimizing-rectangle-algorithm-for-bu.
Wikipedia: "Bin packing problem," in 5 pages, last edited Apr. 25, 2018. https://en.wikipedia.org/wiki/Bin_packing_problem.
International Search Report and Written Opinion, re PCT Application No. PCT/US2019/032970, dated Jul. 29, 2019.
International Preliminary Report for Patentability, re PCT Application No. PCT/US2019/032970, dated Nov. 24, 2020.

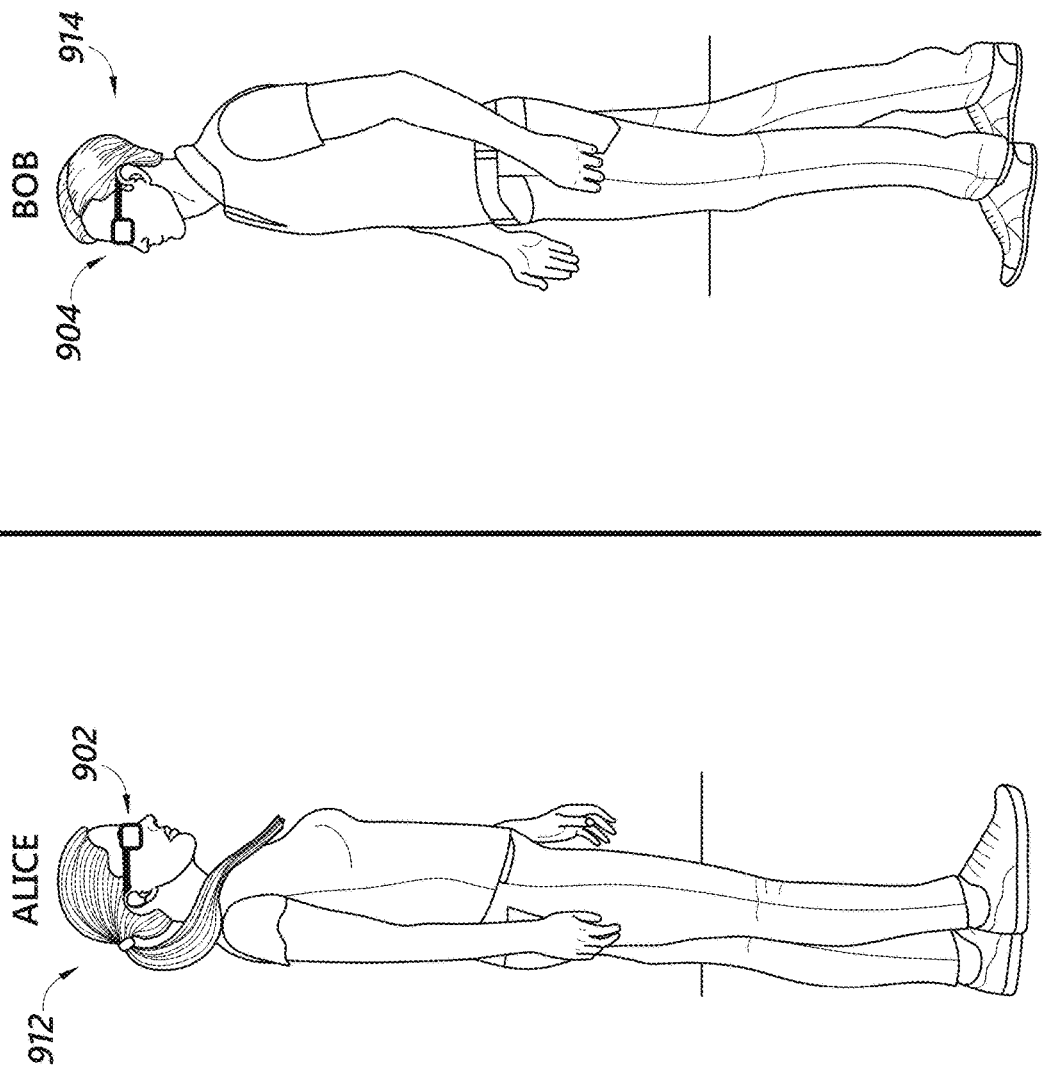

COMPUTER GENERATED HAIR GROOM TRANSFER TOOL

CROSS-REFERENCE TO RELATED APPLICATIONS

This application is a continuation of U.S. National Phase application Ser. No. 17/051,730, filed Oct. 29, 2020, entitled COMPUTER GENERATED HAIR GROOM TRANSFER TOOL, which is a 371 of International Application No. PCT/US2019/033122, filed May 20, 2019, entitled COMPUTER GENERATED HAIR GROOM TRANSFER TOOL, which claims the benefit of priority to U.S. Patent Application No. 62/675,006, filed May 22, 2018, entitled COMPUTER GENERATED HAIR GROOM TRANSFER TOOL, which is hereby incorporated by reference herein in its entirety.

FIELD

The present disclosure relates to virtual reality and augmented reality, including mixed reality, imaging and visualization systems and more particularly to systems and methods for transferring a hair groom generated for a first virtual character to a second virtual character including hairline differences between the first and the second virtual characters.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Computer generated (CG) hair for a virtual character can include strand-based (also referred to as instanced) hair in which many thousands of digital strands represent real human hair strands. Strand-based hair can appear highly realistic, but can take days, weeks, or more to generate for a virtual character. Although creating high-fidelity, strand-based hair for many virtual characters may be practical for big budget commercial movies, doing so in contexts such as AR, VR, MR, or gaming can be time and cost prohibitive.

Accordingly, embodiments of systems and methods for transferring computer-generated hair groom data from a first virtual character (also referred to as a source virtual character) to a second virtual character (also referred to as a target virtual character) are provided. These embodiments can factor in a difference between a hairline of the first virtual character and a hairline of the second virtual character to improve the overall appearance and fit of the hair groom on the second virtual character.

Embodiments of these systems and methods can be used to rapidly and efficiently propagate a hair groom for the first virtual character, which may have taken days or weeks to generate, to many other virtual characters in an AR/VR/MR or gaming environment. Thus, these systems and methods advantageously improve the ability of a CG animation system to propagate hair among many virtual characters in less time and more efficiently than if each character's hair groom had to be styled individually by an animator. Further, these systems and methods advantageously can provide the target virtual characters with a better appearing and better fitting hair groom as compared to, e.g., techniques that simply copy a hair groom from one character to another.

The techniques described herein can be used to transfer a hair grooming dataset from portions of virtual humans, animals, fictitious characters, creatures, or objects to other virtual humans, animals, fictitious characters, creatures, or objects.

Although certain embodiments of the systems and methods for virtual character hair transfer are described in the context of augmented, mixed, or virtual reality, they are not so limited, and can be applied to gaming, movies, or visual effects (VFx).

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 9B illustrates an example telepresence session.

Figure 1:
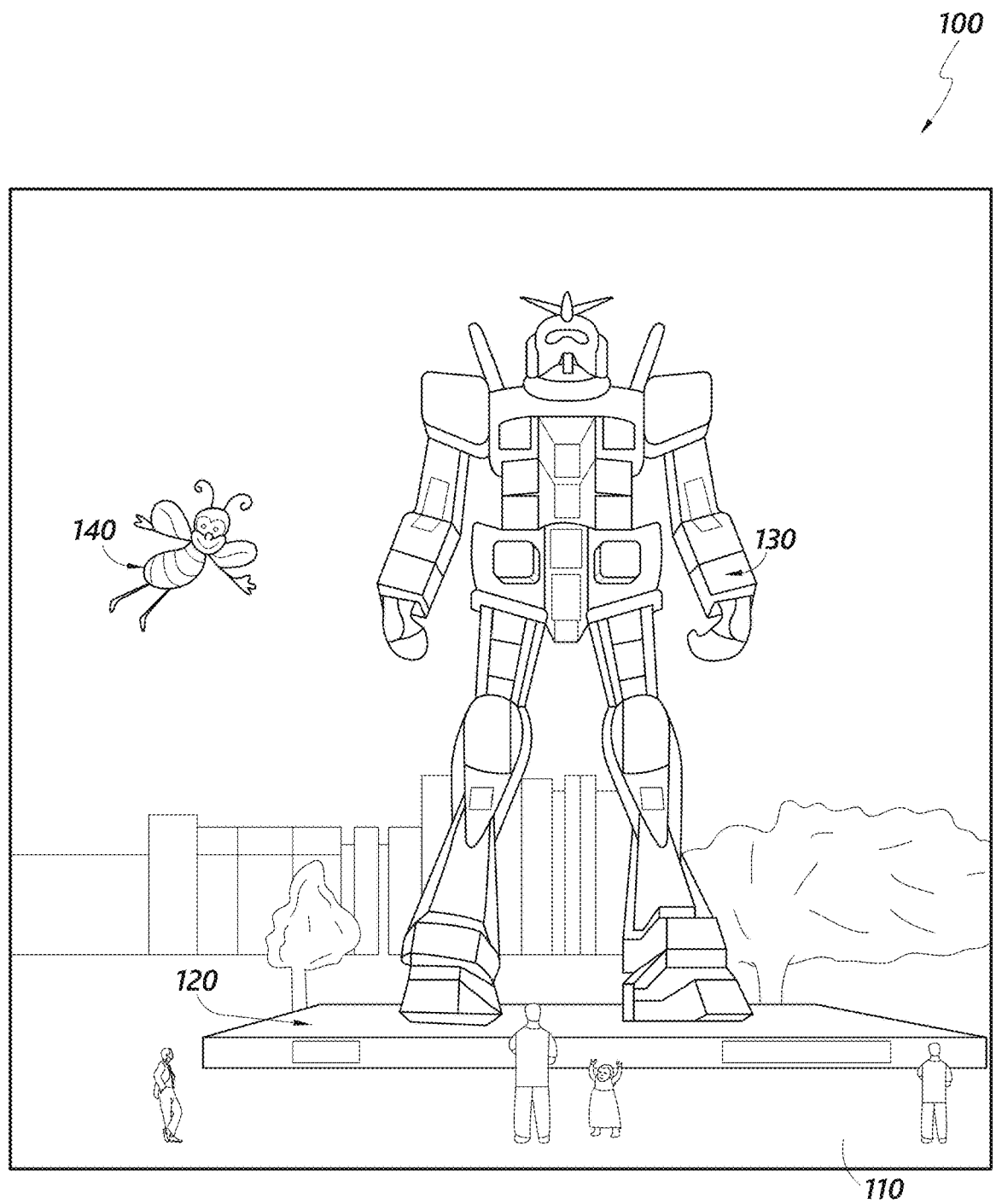
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar can be a virtual representation of a real or fictional person (or an animal, creature, character, or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players or characters in the game. In these examples, and in many other AR/VR/MR or gaming applications, there can be many avatars interacting in the environment.

In the context of big budget commercial movies, creation of many high-fidelity virtual avatars can occur over months or years, with many (e.g., hundreds or thousands) of animators involved. And the avatars can be specific to a single application, namely, the movie. In contrast, for AR/MR/VR or gaming applications, the budget, animator workforce, and production timescales may be significantly reduced, which may necessitate a different approach to creating multiple high-fidelity virtual avatars.

The hair style (also sometimes referred to as a hair groom) of a virtual avatar can have a significant effect on the visual appearance of the avatar, as human viewers of virtual (or real) characters may rely substantially on hair appearance to distinguish and differentiate characters. One goal of animation is to generate realistic-looking hair grooms for the avatar.

Thus, as will be further described below, various systems and methods are provided for rapidly and efficiently transferring a hair groom generated for a first avatar to a second (or more) avatars. These systems and methods advantageously permit creation of multiple high-fidelity virtual avatars, with realistic looking hair, starting from a source avatar (or alternatively, starting with one or more source hair grooms).

Computer generated (CG) hair for a virtual character can include strand-based (also referred to as instanced or interpolated) hair in which many thousands of virtual strands represent real human hair strands. Strand-based hair can appear highly realistic, but can take days, weeks, or more to generate for a single virtual character. Although creating high-fidelity, strand-based hair for many virtual characters may be practical for big budget commercial movies, doing so in contexts such as AR, VR, MR, or gaming can be time and cost prohibitive.

Accordingly, embodiments of systems and methods for transferring computer-generated hair groom data from a first virtual character (also referred to as a source virtual character) to a second virtual character (also referred to as a target virtual character) are described herein.

Directly copying the hair groom data from the source to the target virtual avatar can lead to poor visual appearance, particularly if the head shape of the target avatar is different from the source avatar. For example, the directly-copied hair groom may not fit properly, appear misaligned, or look like it is floating on the top of the head of the target avatar. In many cases, the copied hair groom appears unrealistic and gives the visual appearance that the target avatar is wearing a wig. Thus, direct copying of a hair groom from one avatar to another generally leads to disappointing visual results.

Additionally, the locus of where hair starts on the head (called the hairline) is very visually apparent to viewers of an avatar, particularly the hairline near the forehead. Typically, the source and target avatars will have different hairlines. Direct copying of the hair groom does not account for such differences in hairlines, which is a further reason direct copying leads to poor visual results.

Accordingly, embodiments of the systems and methods described herein can factor in a difference between a hairline of the source virtual avatar and a hairline of the target virtual avatar to improve the overall appearance and fit of the hair groom on the second virtual avatar.

Embodiments of these systems and methods can be used to rapidly and efficiently propagate a hair groom for a source virtual character, which may have taken days or weeks to generate, to many other virtual avatars in an AR/VR/MR or gaming environment. Thus, these systems and methods advantageously improve the ability of a CG animation system to propagate hair among many virtual avatars in less time and more efficiently than would occur if each avatar's hair groom had to be styled individually by an animator. Further, these systems and methods advantageously can provide the target virtual avatars with a better appearing and better fitting hair groom as compared to techniques that directly copy a hair groom from one character to another.

Although the examples in this disclosure generally describe transferring a hair groom for a human avatar (and in particular, hair on the avatar's head), analogous techniques can be applied to transfer hair elsewhere on the human body or to transfer a hair groom or fur on animals, or hair or skin texture on fictitious creatures, and so forth.

Examples of 3D Display of a Wearable System

A wearable system (also referred to herein as an augmented reality (AR) system) can be configured to present two-dimensional (2D) or three-dimensional (3D) virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
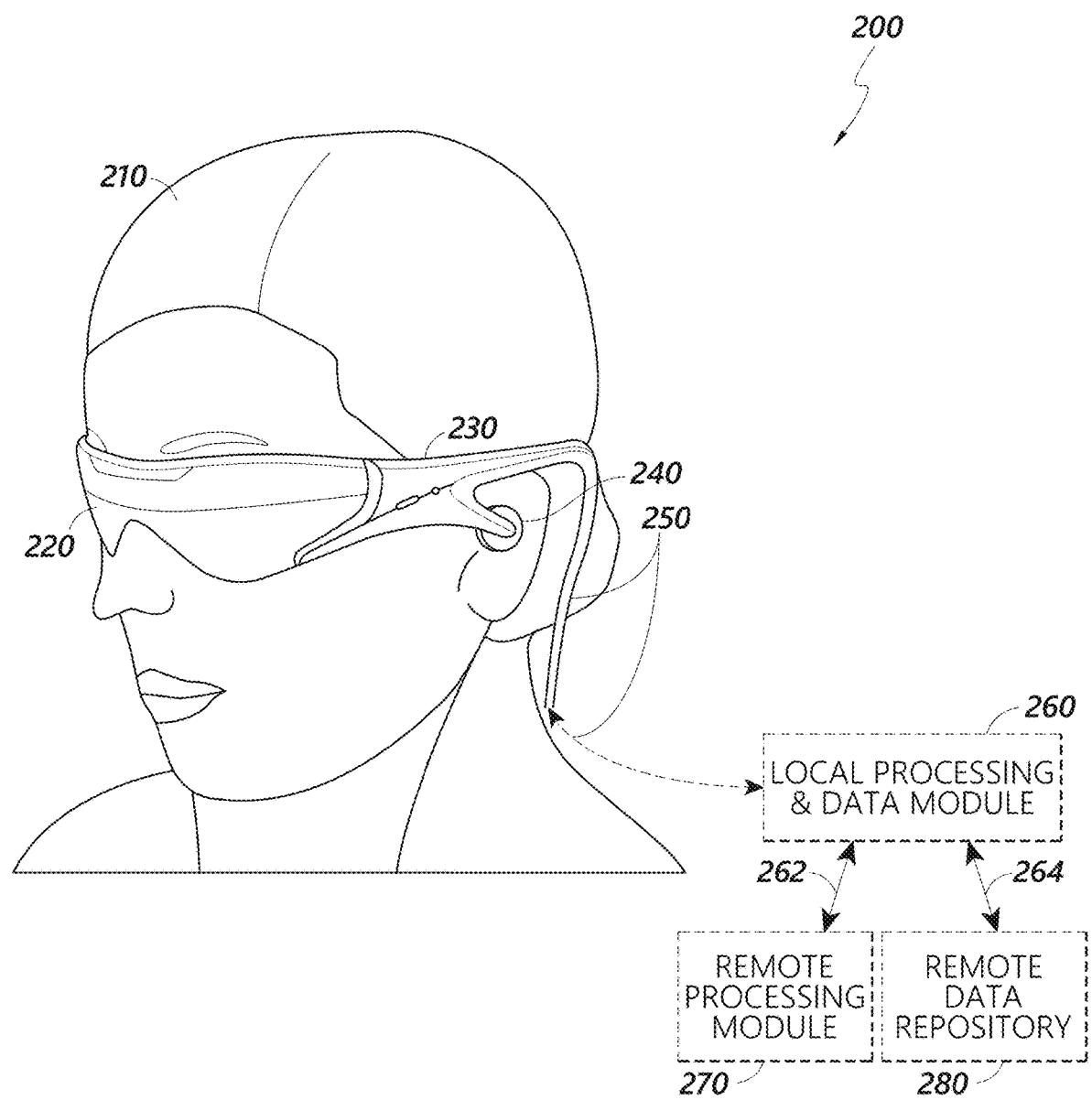
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
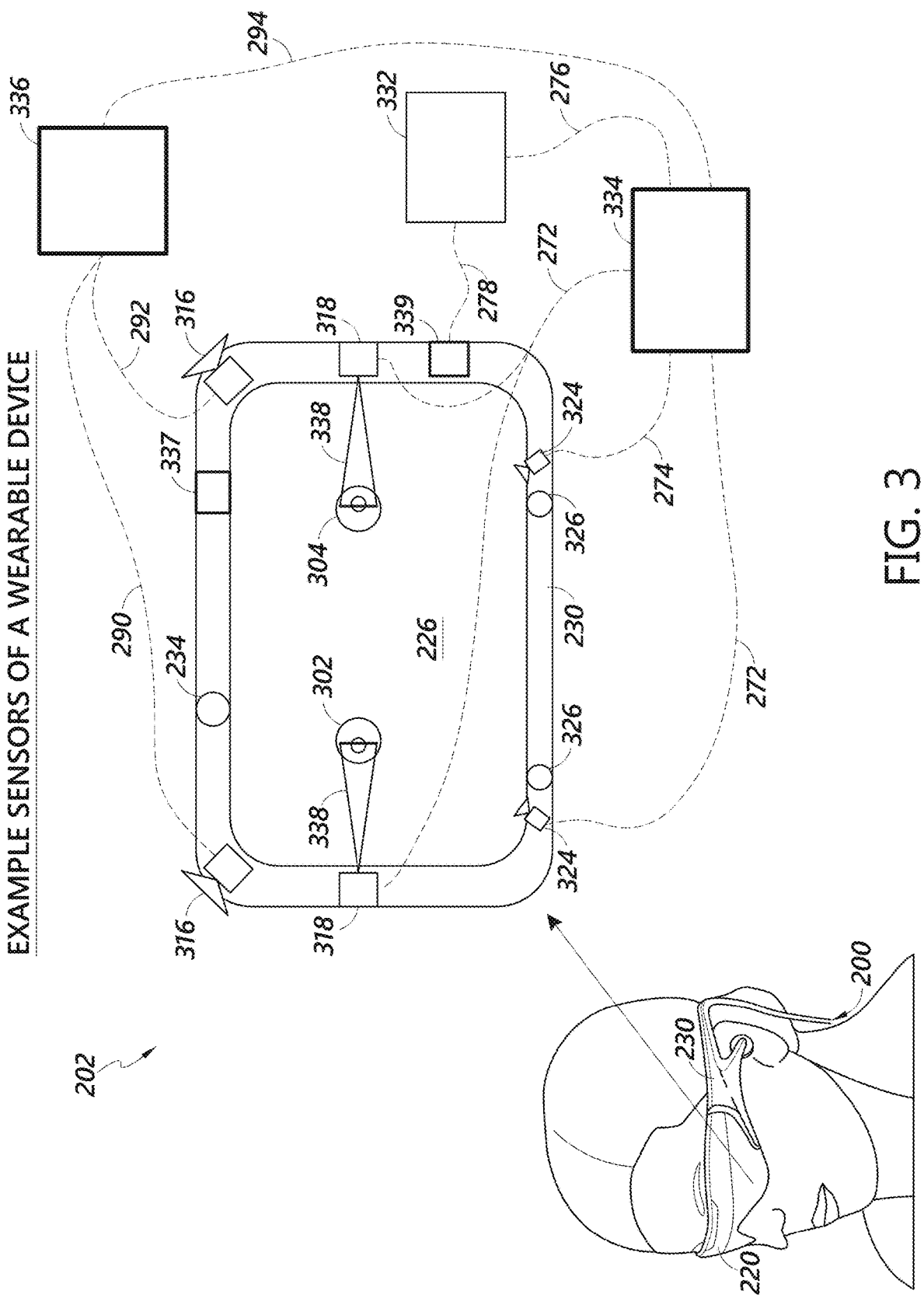
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
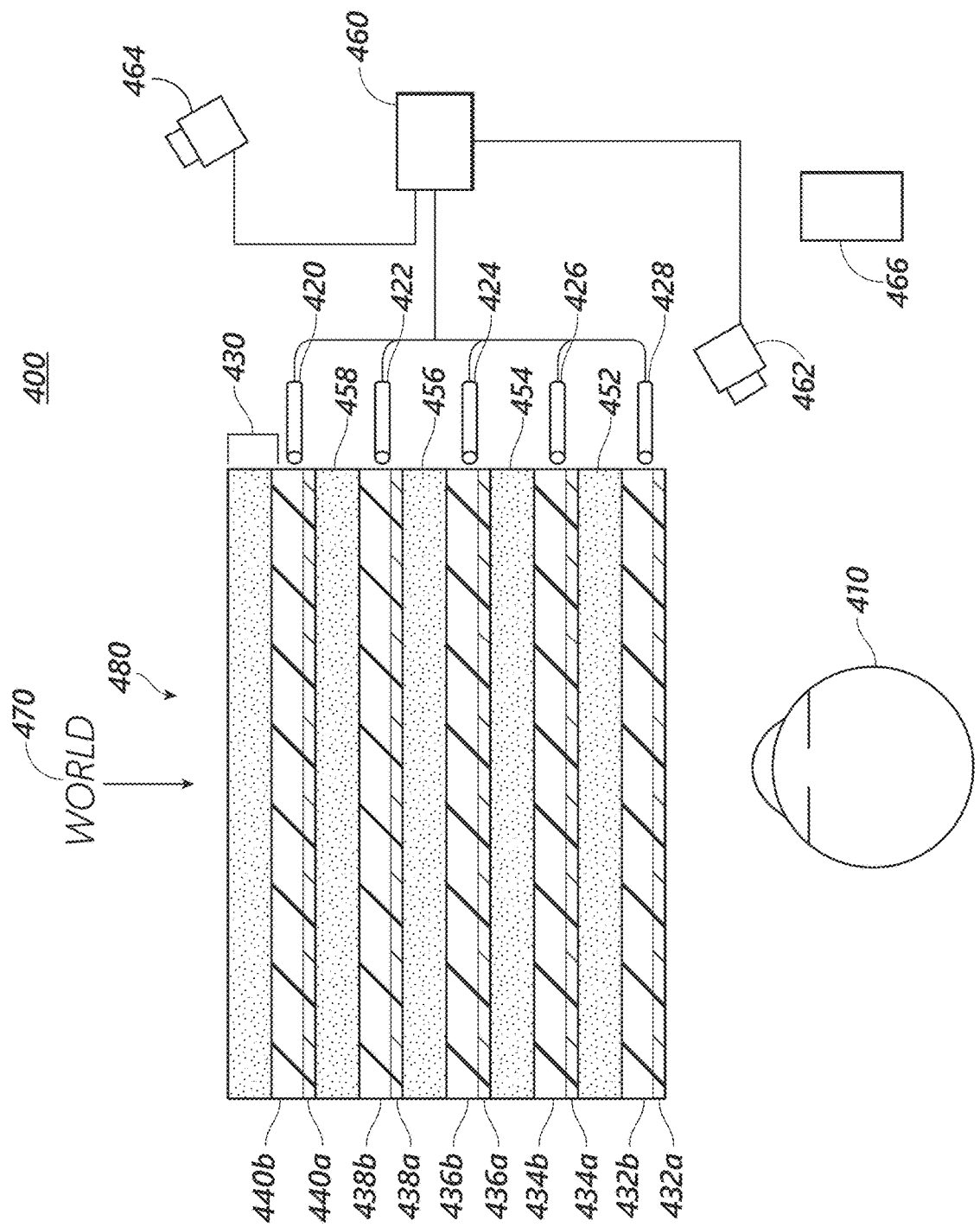
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 440*0b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with A Wearable System

Figure 5:
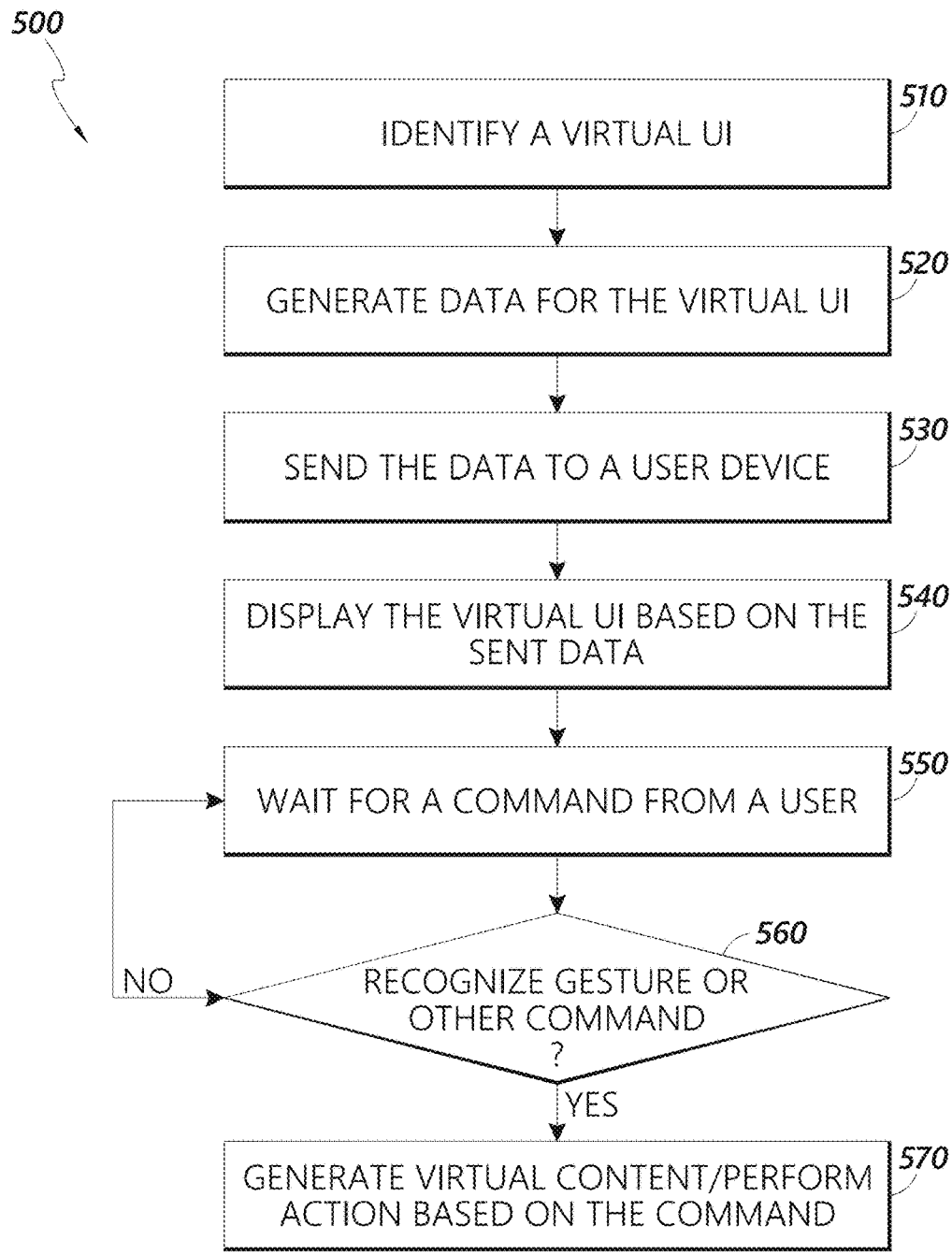
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
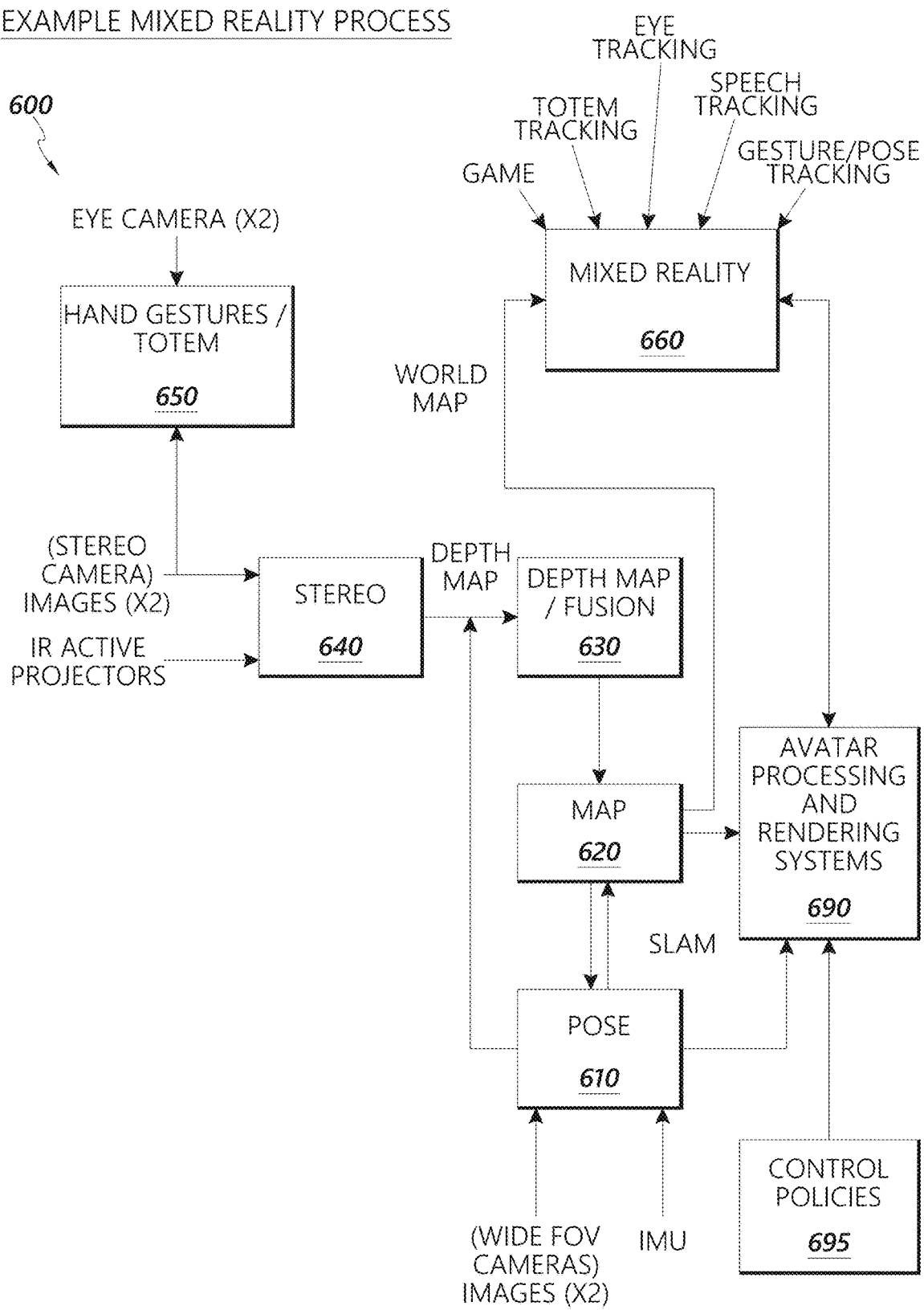
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. As will be further described with reference to FIGS. 11-20, the avatar processing and rendering system 690 can use one or more control policies 695 to animate avatar movements in real time. The control policies 695 can be pre-calculated, offline from the system 695, and used in real-time to render avatar locomotion. The control policies 695 can be calculated using Markov decision process (MDP) techniques. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
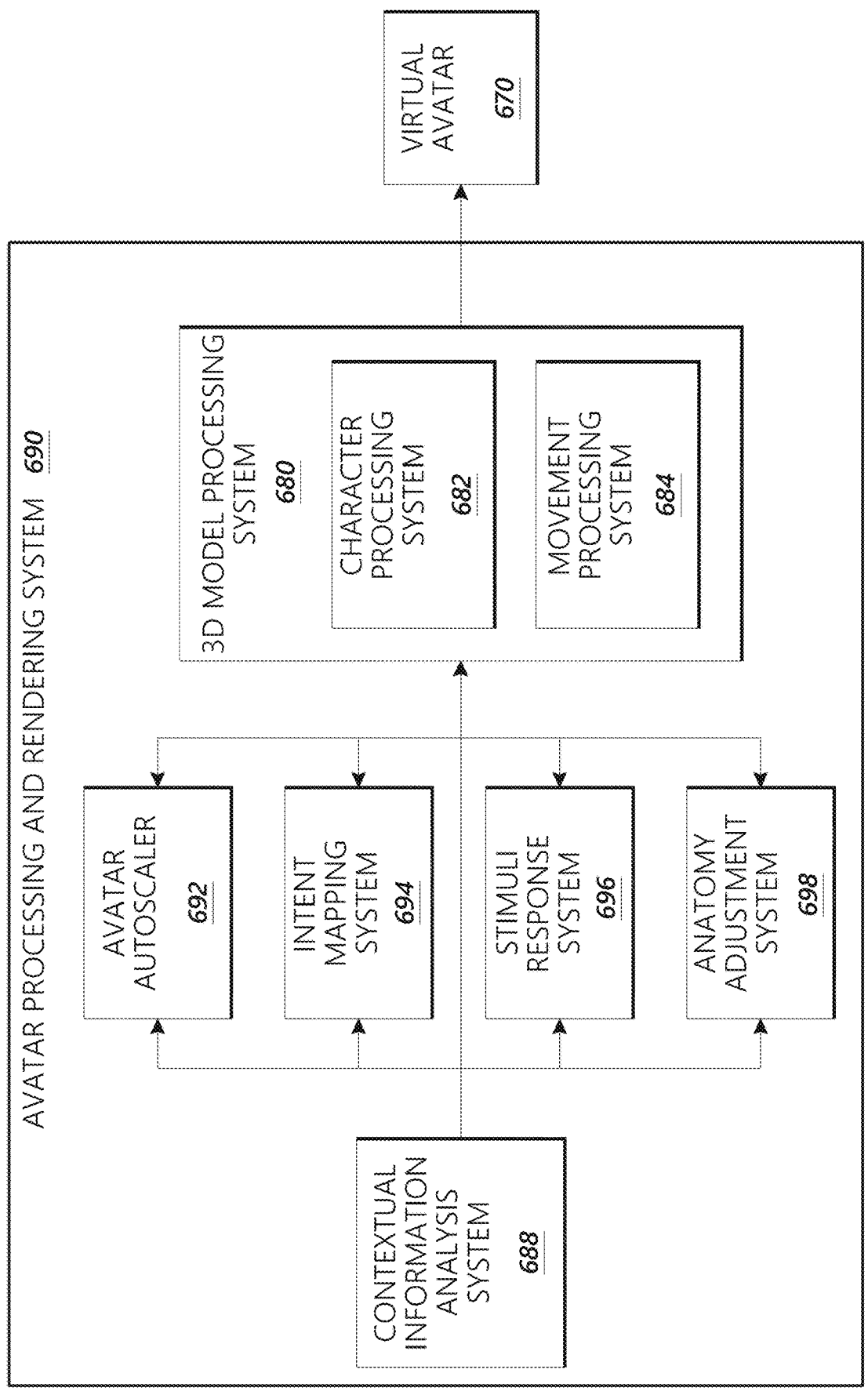
FIG. 6B illustrates example components of an avatar processing and rendering system.

FIG. 6B illustrates an example avatar processing and rendering system 690. The avatar processing and rendering system 690 can implement the mesh transfer techniques described with reference to FIGS. 11-14C. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting.

For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc. For example, in some implementations, the 3D model processing system 680 (e.g., via the character processing system 682) can access strand-based hair groom data for hair on an avatar and render the strand-based hair groom for display to the user.

Examples of Mapping a User's Environment

Figure 7:
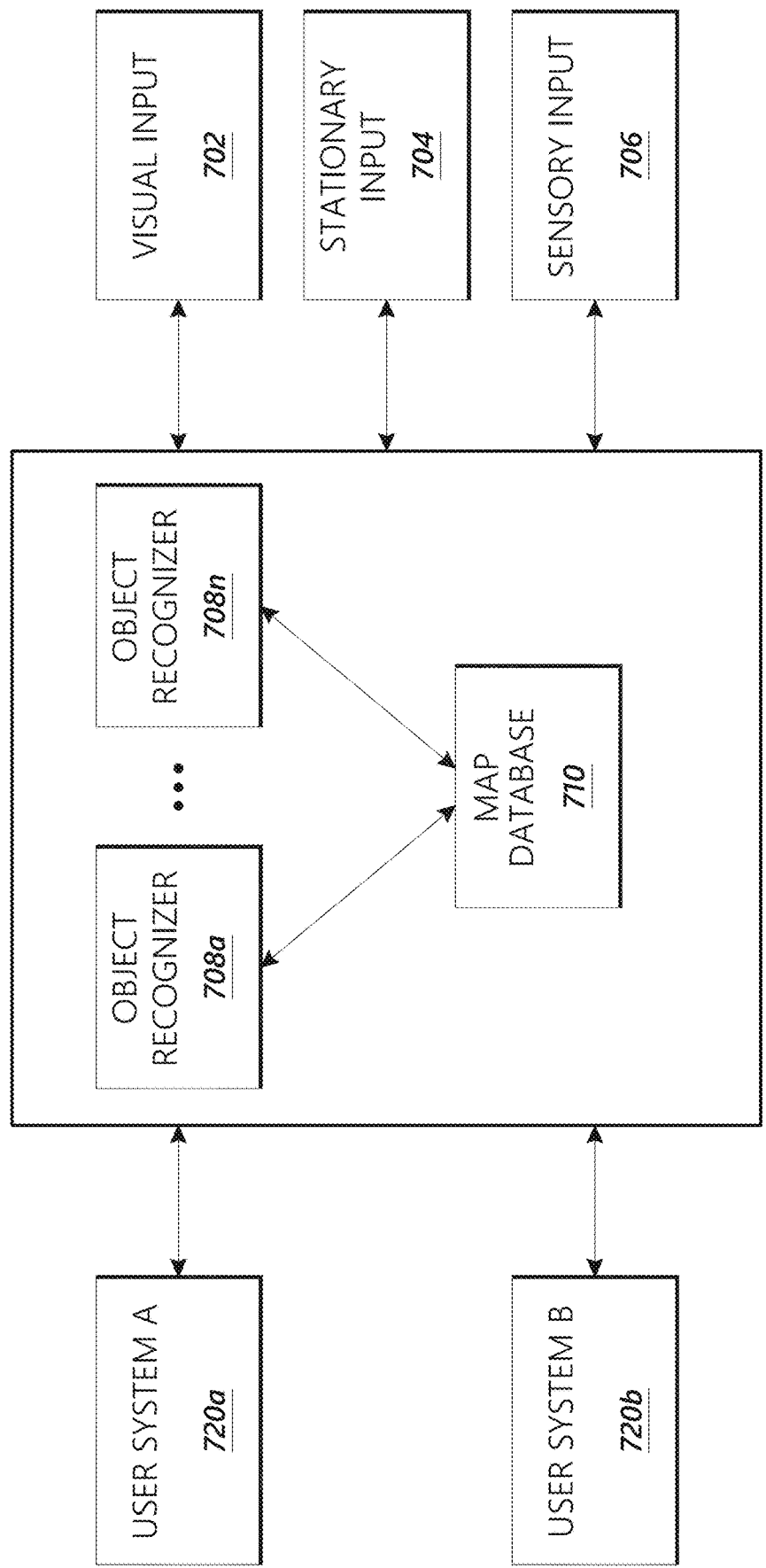
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, doors, user input devices, televisions, documents, other objects in the user's environment, etc. One or more object recognizers may be specialized for object with certain characteristics. For example, the object recognizer 708a may be used to recognizer faces, while another object recognizer may be used recognize cuboidal objects (e.g., desks, chairs, sofas, tables, etc.).

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons, objects, or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
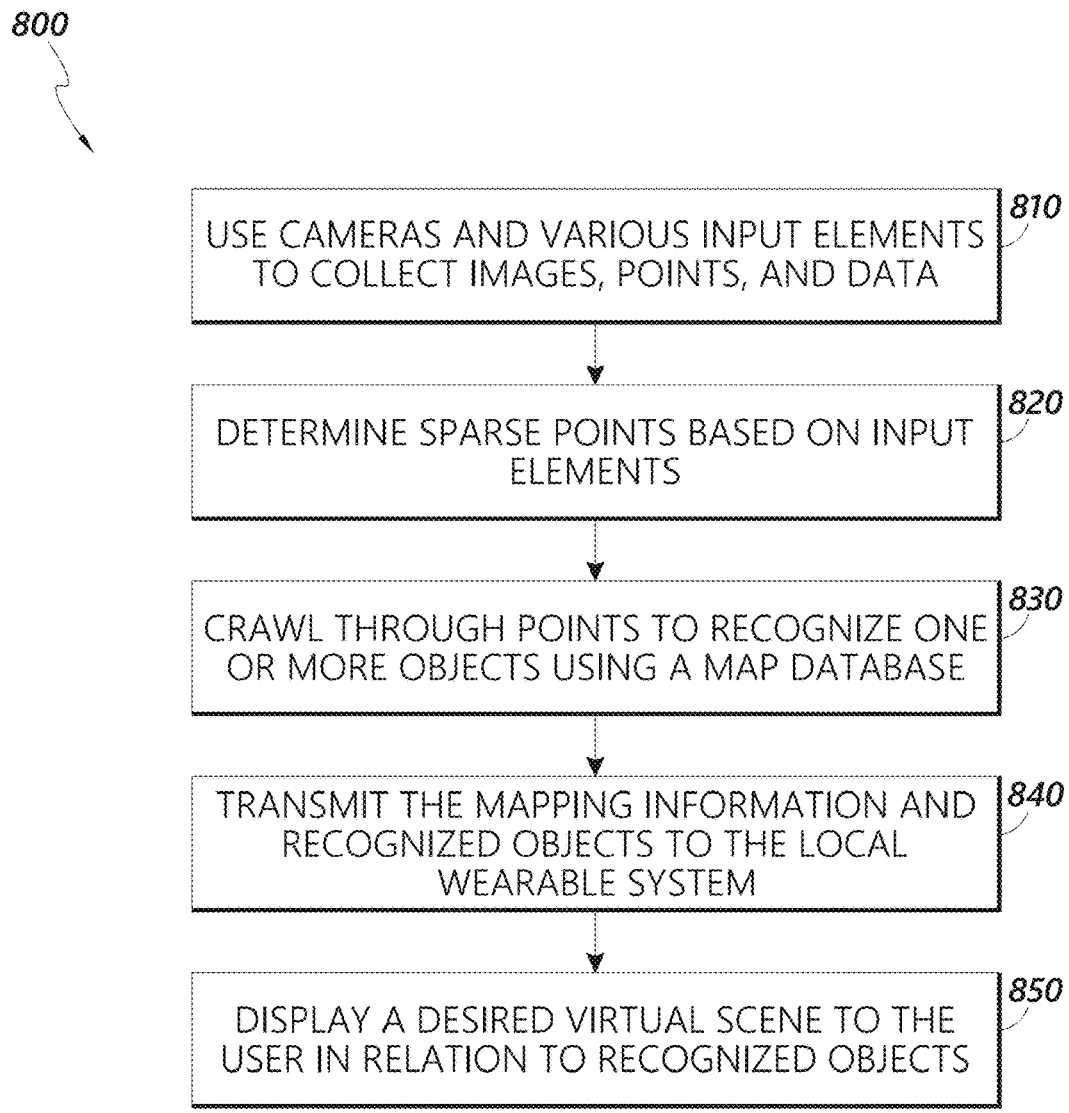
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
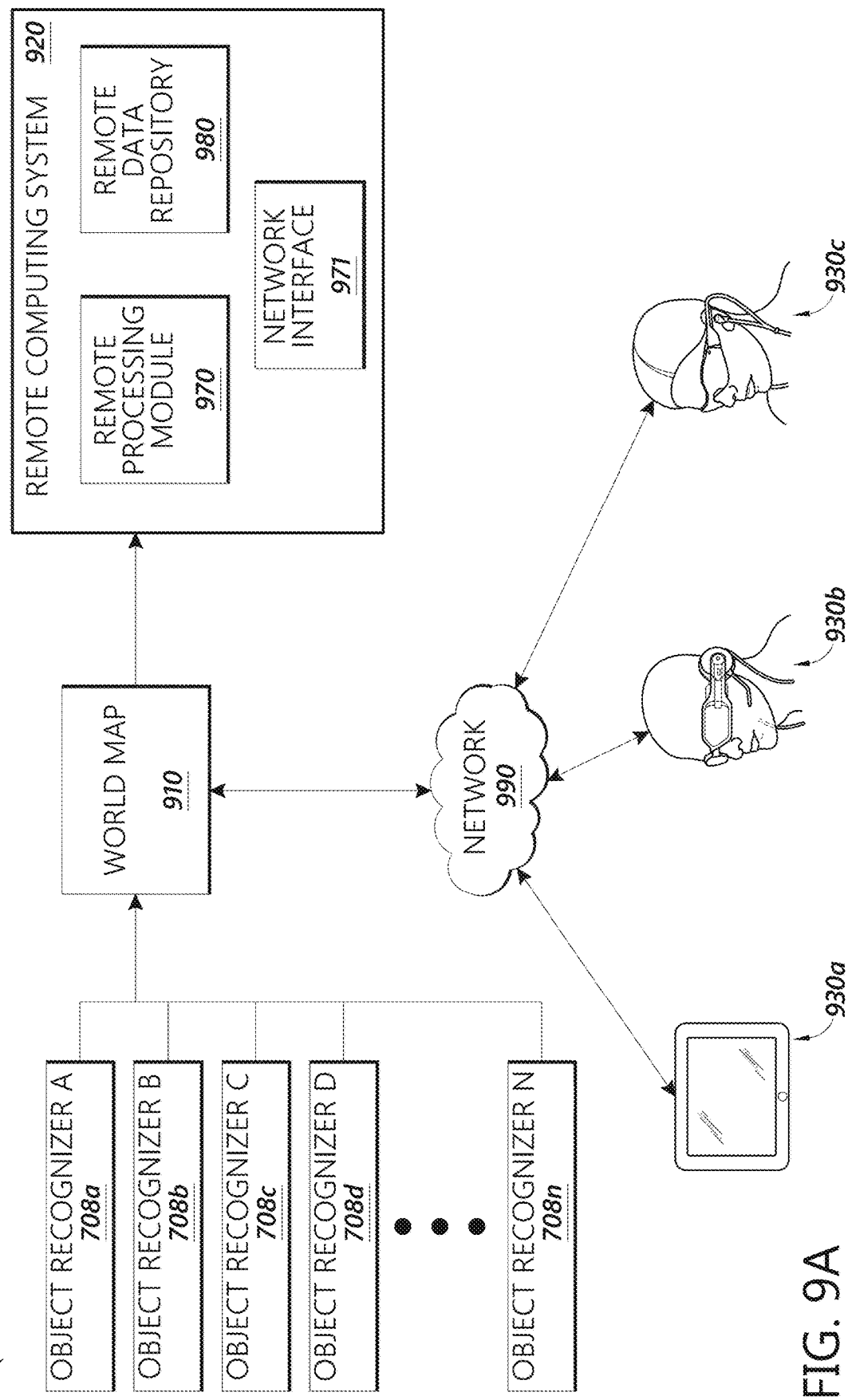
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
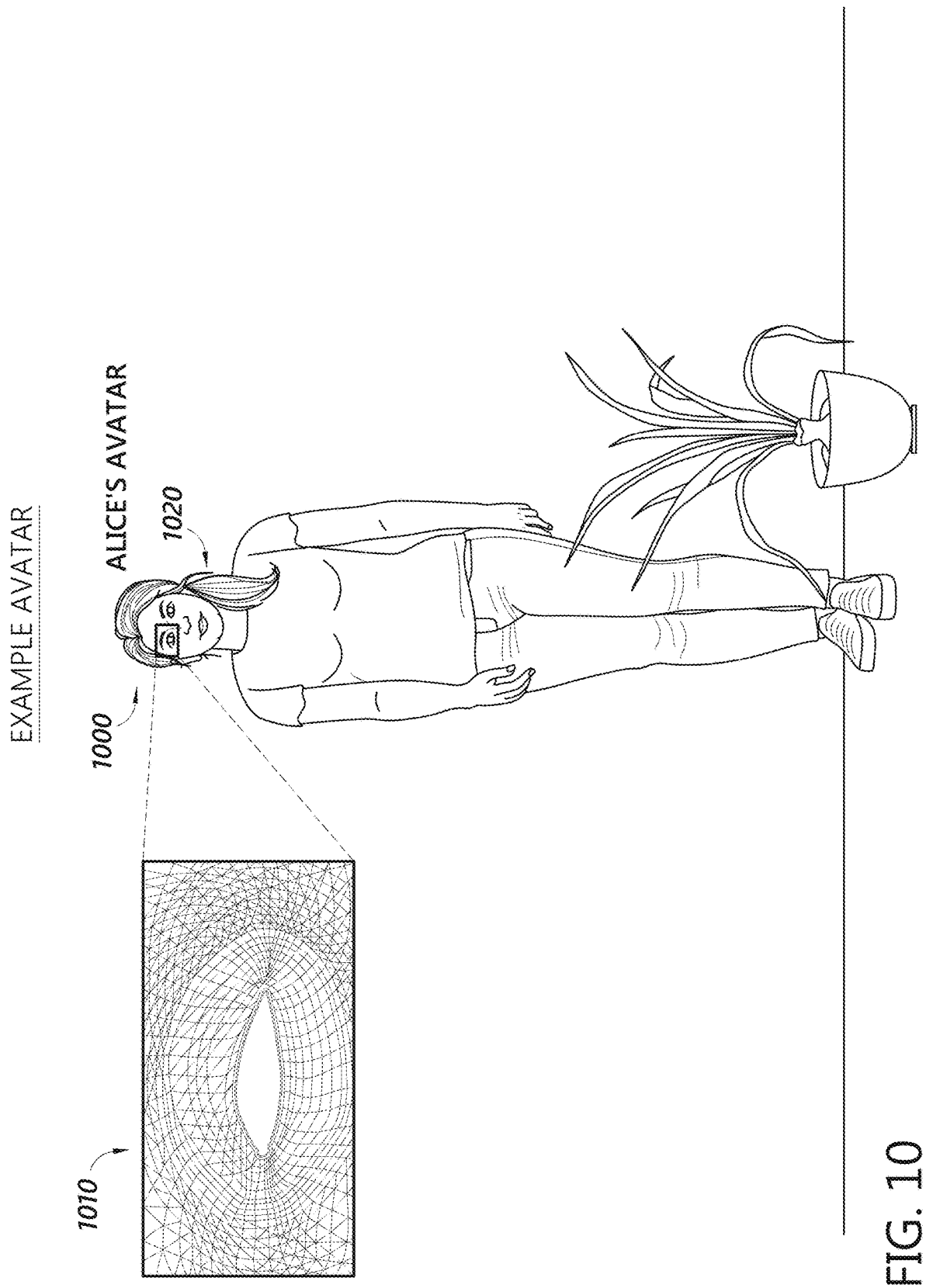
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As described herein, hair groom 1020 of the avatar 1000 can be represented as strand-based hair. In some implementations, the hair groom of the avatar 1000 is transferred from a previously-generated hair groom for another avatar, taking account of the different hairlines of these avatars. As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000. While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000. The mesh 1010 may be relatively fine (e.g., have a relatively large number of points), to facilitate a high quality simulation of the complex curves and movements that occur in the eye region.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are summed in proportion to the respective weights assigned to that vertex for each of the joints. There are well known limitations to LBS in practice, and much of the work in making high-quality rigs (e.g., for movies) is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object. Additional discussion of constraints that can be used in embodiments of the disclosed joint decompositions is provided below.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes (or linear skins) to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

A goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Example Generation of Strand-Based Hair for a Virtual Avatar

Creation of a virtual avatar can be a time-consuming and intensive process, which requires much interaction with human animators and much trial-and-error to achieve a realistic, high-fidelity digital character. In some implementations, the high-fidelity avatar is generated offline from a real-time rendering system (e.g., the wearable system 200 in an AR/VR/MR context). The high-fidelity digital avatar data can be reduced to a lower-resolution format (e.g., via decimation) that is suitable for the real-time rendering system.

The hair groom for the virtual avatar can be created as strand-based hair, which can comprise hundreds of thousands of individual, digital, virtual strands that are designed to mimic real hair strands.

FIGS. 11A-11E are examples that show some of the processes in generating a strand-based hair groom for a virtual avatar 1000. The process can be performed by a computing system comprising computer hardware and non-transitory storage such as, e.g., the remote computing system 920, which executes a 3D animation application. A human animator may direct or control the generation of the avatar's strand-based hair using the 3D animation application such as, e.g., Maya (available from Autodesk Inc., San Rafael, Calif.), Blender (available at www.blender.org), or Houdini (available from Side Effects Software Inc., Toronto, Canada).

Figure 11A:
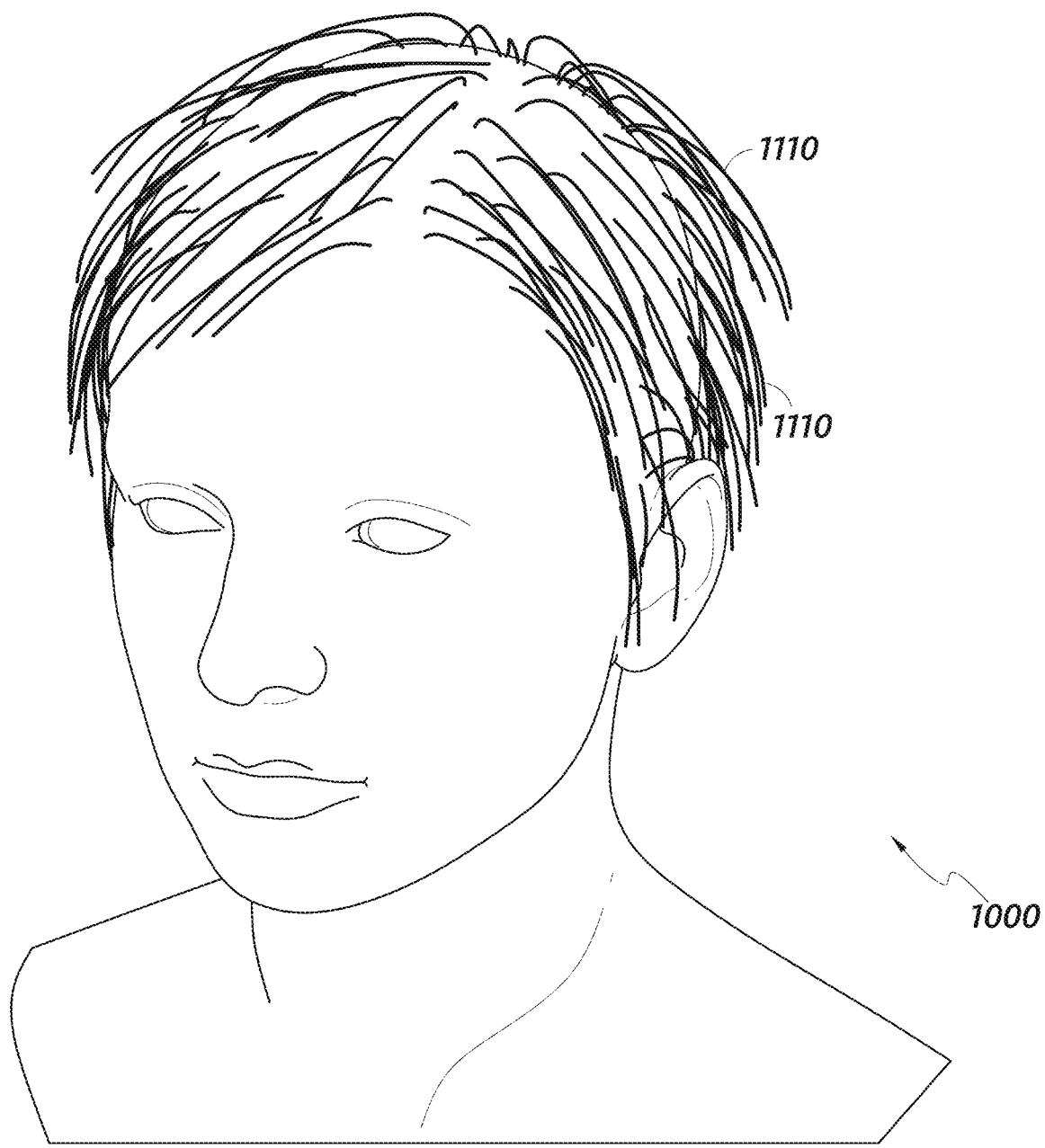
FIG. 11A illustrates an example of an avatar showing examples of guide curves for generating strand-based (instanced) hair for the avatar.
Figure 11B:
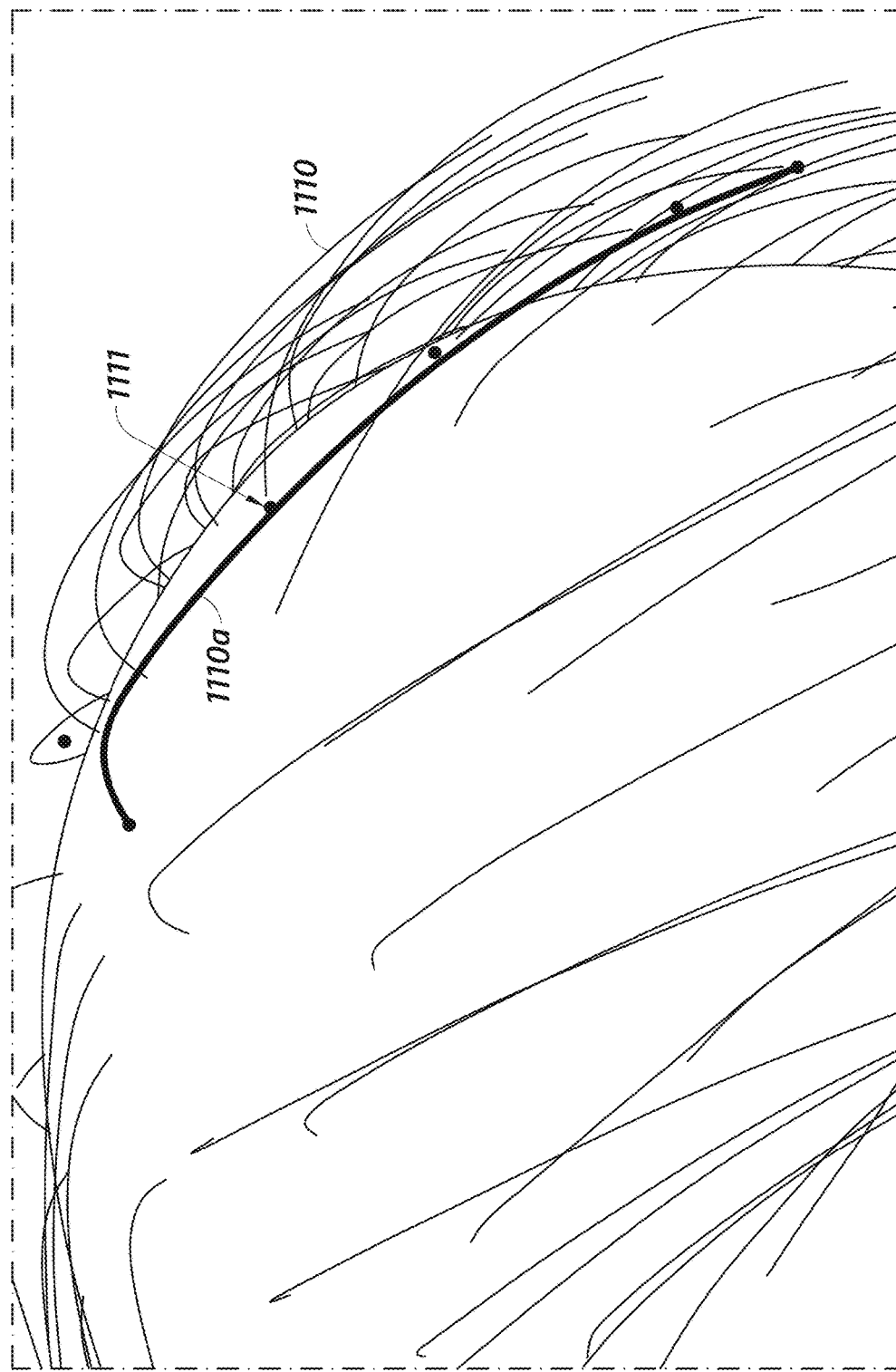
FIG. 11B is a close-up view of a portion (shown in the dot-dash box) of the hair surface (e.g., scalp) of the avatar of FIG. 11A.

FIG. 11A is an example of the head of an avatar 1000 to which strand-based hair is to be attached. Guide curves 1110 determine the overall hair shape, and an animator models these guide curves using the 3D animation software application. Guide curves are also sometimes referred to as guide hairs, control hairs, or guide strands. FIG. 11B is a close-up view of a portion (shown in a dot-dash box) of the head of the avatar 1000 shown in FIG. 11A showing the guide curves 1110, with one of the guide curves 1110a highlighted. The guide curves 1110 are 3D curves having an end at the scalp (sometimes referred to as the root or the base), extending to a tip, and each curve can be individually shaped by the animator Points 1111 on or adjacent the guide curve 1110a are control points, which the animator can move to shape the curvature and position of the guide curve.

Guide curves can be located throughout the hair region and are not necessarily evenly distributed over the surface (e.g., the scalp). Since the final, strand-based hair may include over 100,000 strands, it is impractical for the animator to model each individual strand. The animator models each guide curve 1110 (typically several hundred) by adjusting its shape, properties, spacing, etc., and the 3D animation application interpolates the additional hair strands across the hair area as instances of the guide curves. Thus, strand hair is sometimes referred to as instanced hair (or interpolated hair), because the hair strands are instances of the modeled guide curves. In the description below, the terms guide curves or strands (or hair strands) may be used interchangeably, since strands are instances of the guide curves, and the hair groom transfer techniques can operate with guide curves, strands, or both guide curves and strands.

The guide curves or strands can be modeled as a series of points (or vertices) ordered from the root to the tip of the hair strand, and can be associated with a number of strand parameters that define the characteristics of the hair (e.g., how points of each strand are connected to each other). As noted above, additional strands of hair can be generated as instances of the guide curves to provide a full set of hair for the avatar. The instances of the hair can be generated from the guide curves based at least partly on hair instance parameters. For example, hair instance parameters can include curliness, clumpiness (which breaks up the uniformity of hair flow), taper, width, distribution across the surface (e.g., uniform or clumped), length, color, noise (which generates small waves through the strands), density (e.g., how many strands (or strands per unit area) will be instanced), etc.

Figure 11C:
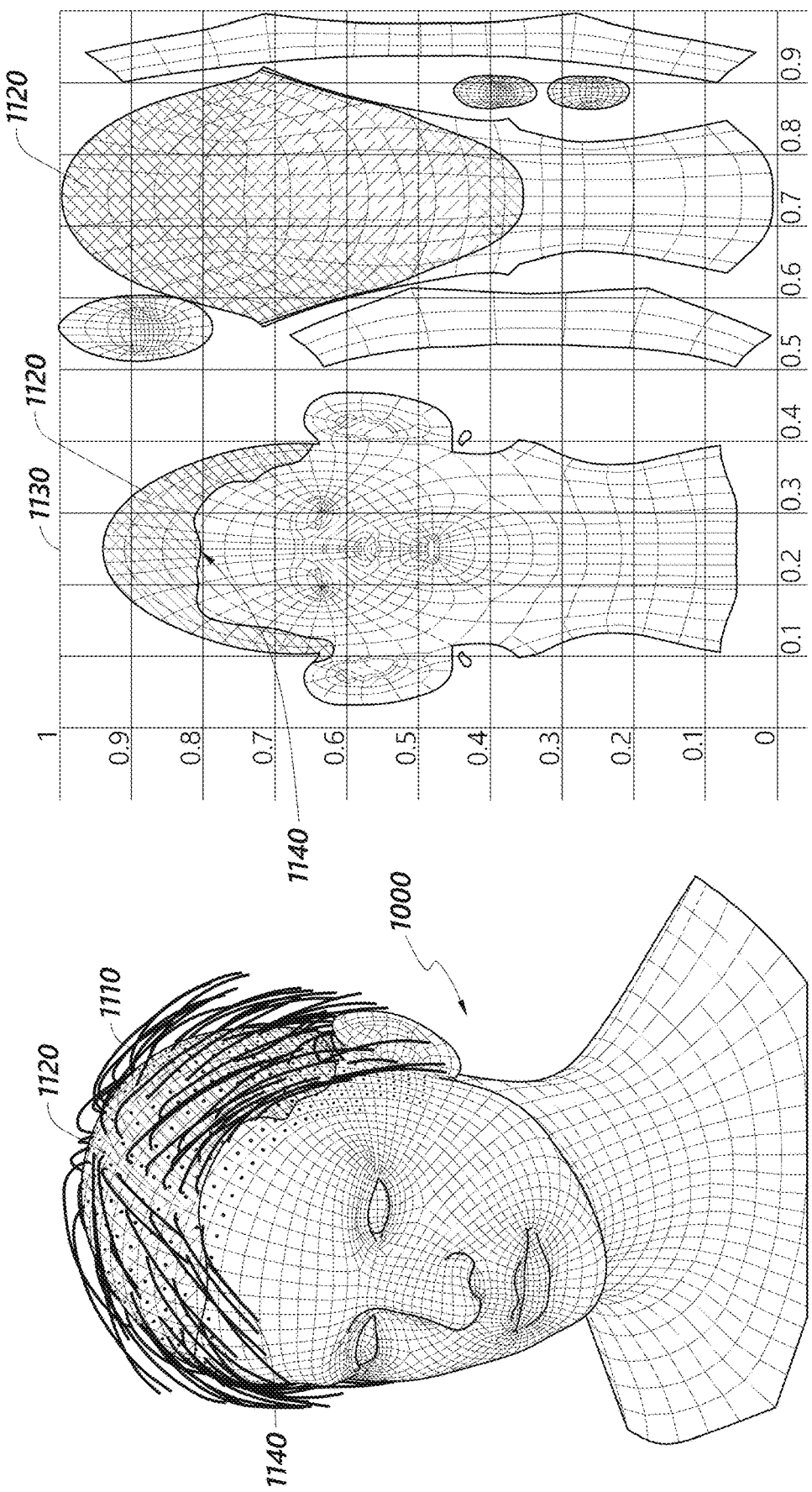
FIG. 11C illustrates an example of a hair mask (shown cross-hatched) that defines a region where hair will be generated on the avatar. The left panel is a 3D view of the avatar in physical space (e.g., xyz coordinates), and the right panel is a 2D view of the hair mask in texture space (e.g., UV coordinates).

FIG. 11C illustrates an example of a hair mask 1120 on the head of the avatar 1000. The avatar 1000 is shown in 3D wireframe on the left side of FIG. 11C, with the hair mask 1120 superimposed on the avatar 1000. The hair mask 1120 is the region of the avatar on which hair will be generated and is shown in the wireframe mesh as mesh cells with central dots. The hair mask 1120 can be specific to a particular avatar to show the individual nature of where the avatar's hair grows on the avatar's head. The hair mask for an avatar representing a human model can be obtained from one or more images of the model (e.g., via photogrammetry). FIG. 11C also shows the guide curves 1110.

FIG. 11C includes an example UV view 1130 of the avatar 1000 and the hair mask 1120 in texture coordinate space. The UV view 1130 shows a UV mask (also called a map) of the front and the back of the avatar's head with the hair mask 1120 illustrated with cross-hatching. The hair mask is sometimes referred to as a UV mask or UV map.

UV mapping is a 3D modeling process of projecting a 2D image to the surface of a 3D object (e.g., an avatar) for texture mapping. UV mapping projects a texture map onto the 3D object to add texture to the polygons defining the 3D object. The letters U and V are commonly used to denote the (orthogonal) axes of the 2D texture space, because the letters x, y, and z are commonly used to denote the Cartesian axes of 3D physical space. Each of the coordinates U and V typically is in the range from 0 to 1. UV texturing permits polygons that make up the 3D object (e.g., the polygons are shown on the 3D wireframe of the avatar 1000 on the left in FIG. 11C) to be applied with texture (e.g., color, high frequency details, surface texture, surface attributes) from a UV texture map image. The UV mapping process assigns pixels in the texture map image to surface mappings on polygons of the 3D object. The texture image can comprise a 2D image (e.g., a bitmap with, for example, 0 to 255 values per pixel).

Figure 11D:
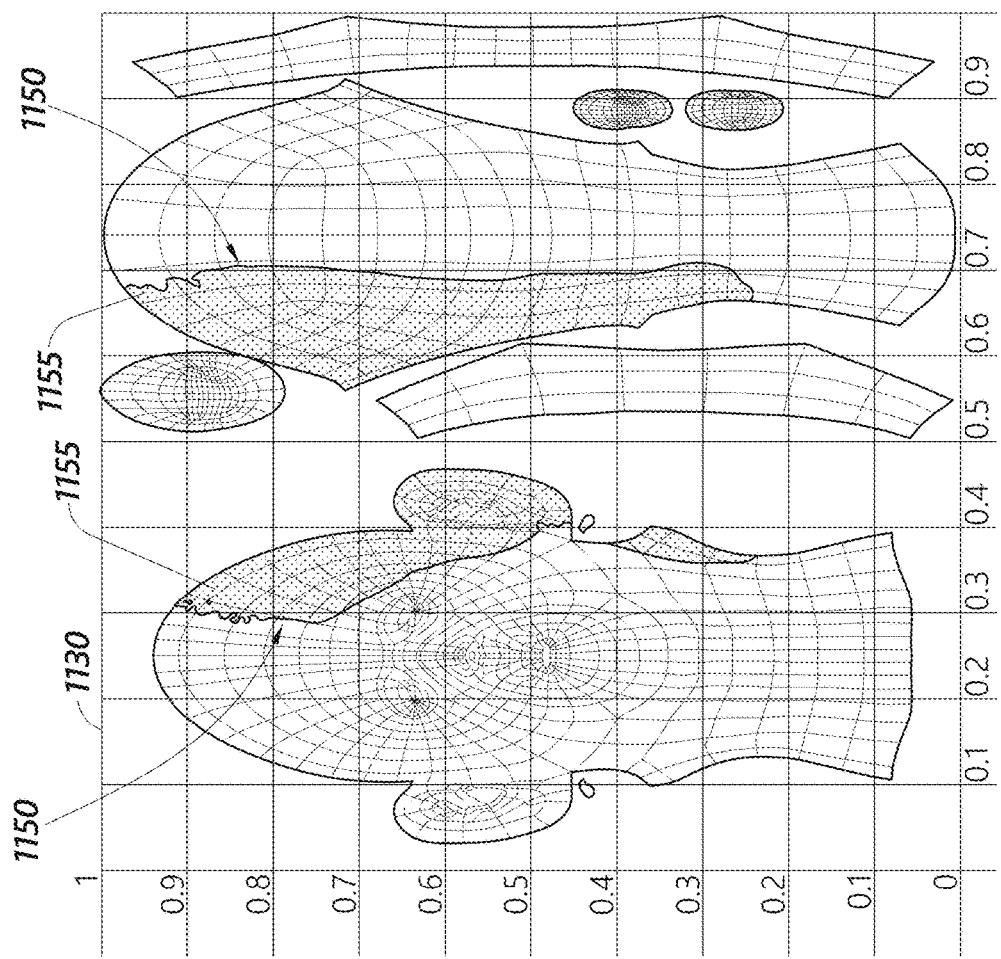
FIG. 11D illustrates an example of a hair region having a hair part. The left panel shows a 3D space view and the right panel shows a texture space view.
Figure 11D:
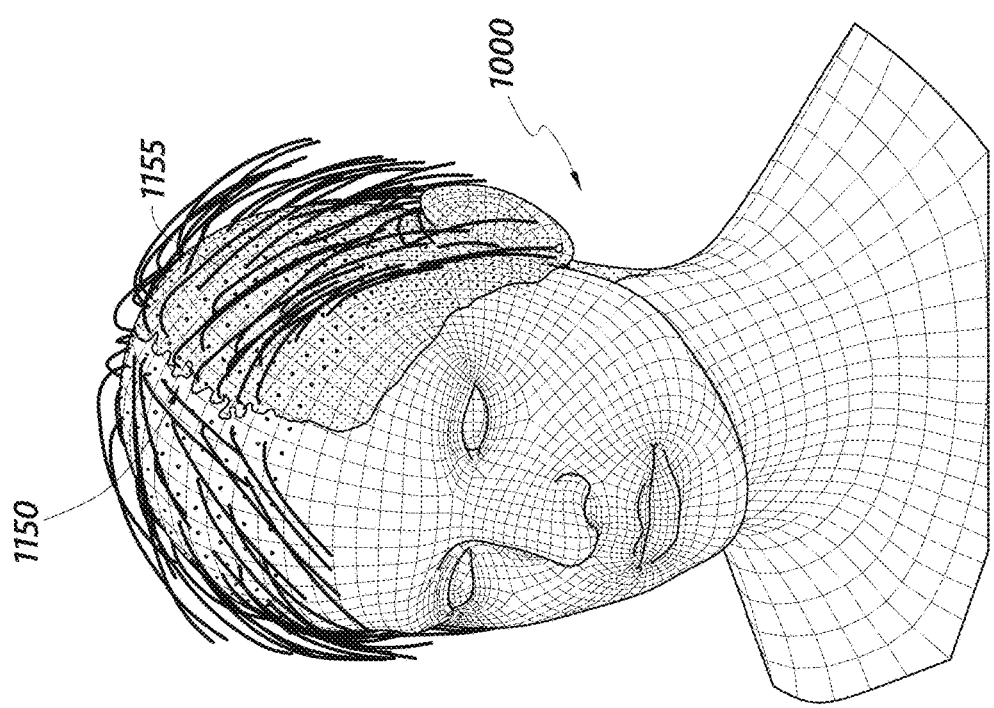

Hairlines and parts can be represented in the hair mask 1120. For example, as shown in FIG. 11C, an edge of the hair mask 1120 can represent a hairline 1140. FIG. 11D (3D view on the left, UV view 1130 on the right) shows an example of a part 1150 in the hair mask 1120. The hair in the hair region 1155 of the hair mask 1120 (e.g., on the left side of the avatar's head) can have different characteristics than the hair on the other side of the part 1150 (e.g., the direction in which the hair lays on the avatar's head). Hairlines 1140 and part lines 1150 can be automatically detected by the 3D animation application, e.g., via contour detection (which can provide an outline of the hairline(s) and part(s)).

Figure 11E:
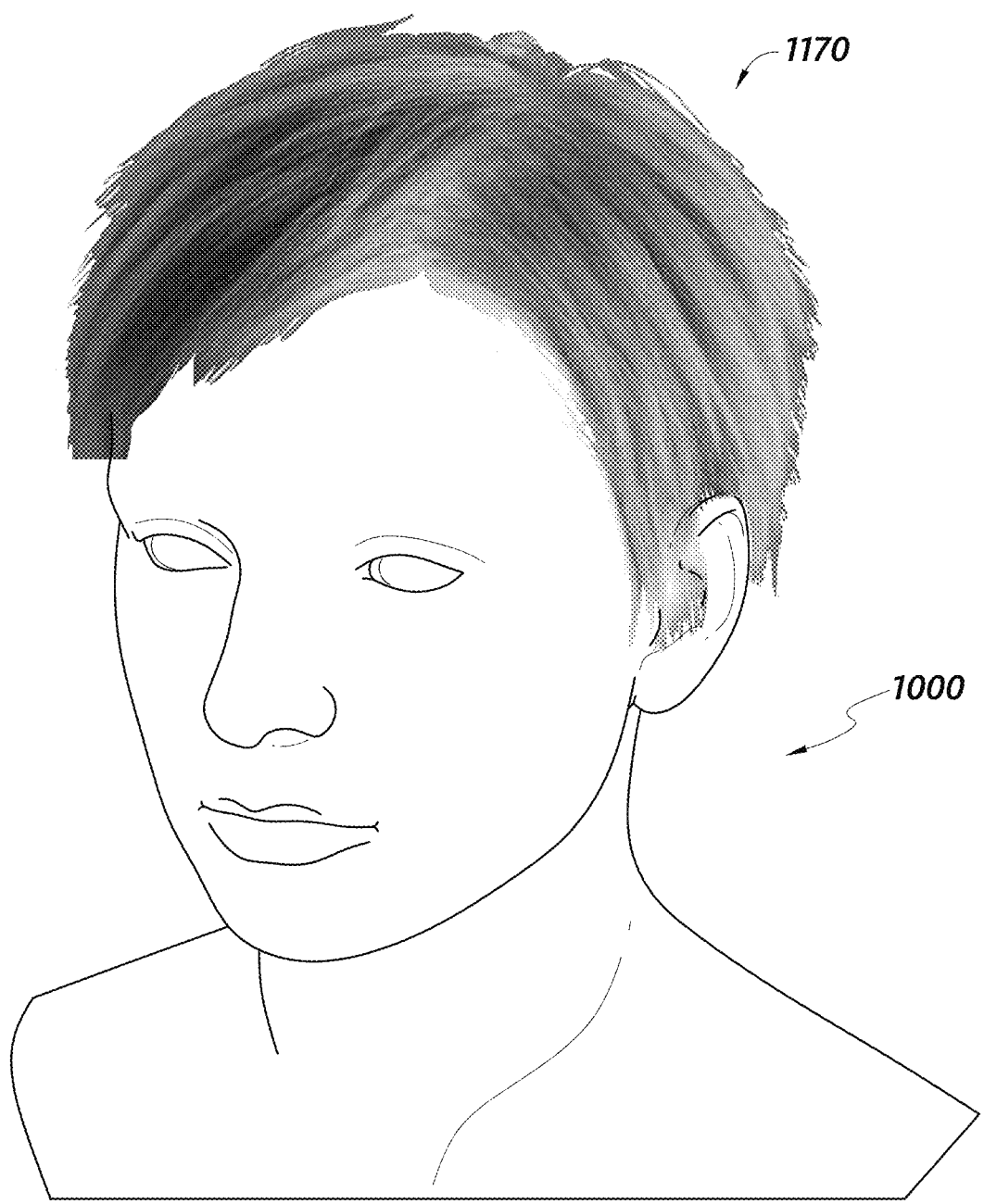
FIG. 11E illustrates an avatar with an example of strand-based hair. The virtual strands in the avatar's strand-based hair mimic real strands of human hair.

FIG. 11E is a rendering of an example of a strand-based hair groom 1170 on the avatar 1000. Hair strands are instanced (by the 3D animation application) based on the guide curves 1110, the hair mask 1120, and optionally the hair regions 1155 (e.g., representing parts, if present), and the hair instance parameters (e.g., density, density, clumping, curliness, noise, etc.).

Although very lifelike in appearance, strand-based hair for an avatar is time-consuming to create and cannot readily be transferred to another avatar. For example, as described above, direct copying of the hair groom 1170 to a target avatar can give the appearance that the target avatar is wearing a wig, rather than having its own individual hair groom. Further, if the hairline of the target avatar is different from the hairline of the hair groom 1170 (see, e.g., the hairline 1140 in FIG. 11C), the copied hair groom will lead to a visual appearance different than intended due to the hairline mismatch.

Accordingly, embodiments of systems and methods are described herein that transfer a hair groom from a source avatar to a target avatar, taking into account at least the difference in hairlines of the source and target avatars.

Figure 12:
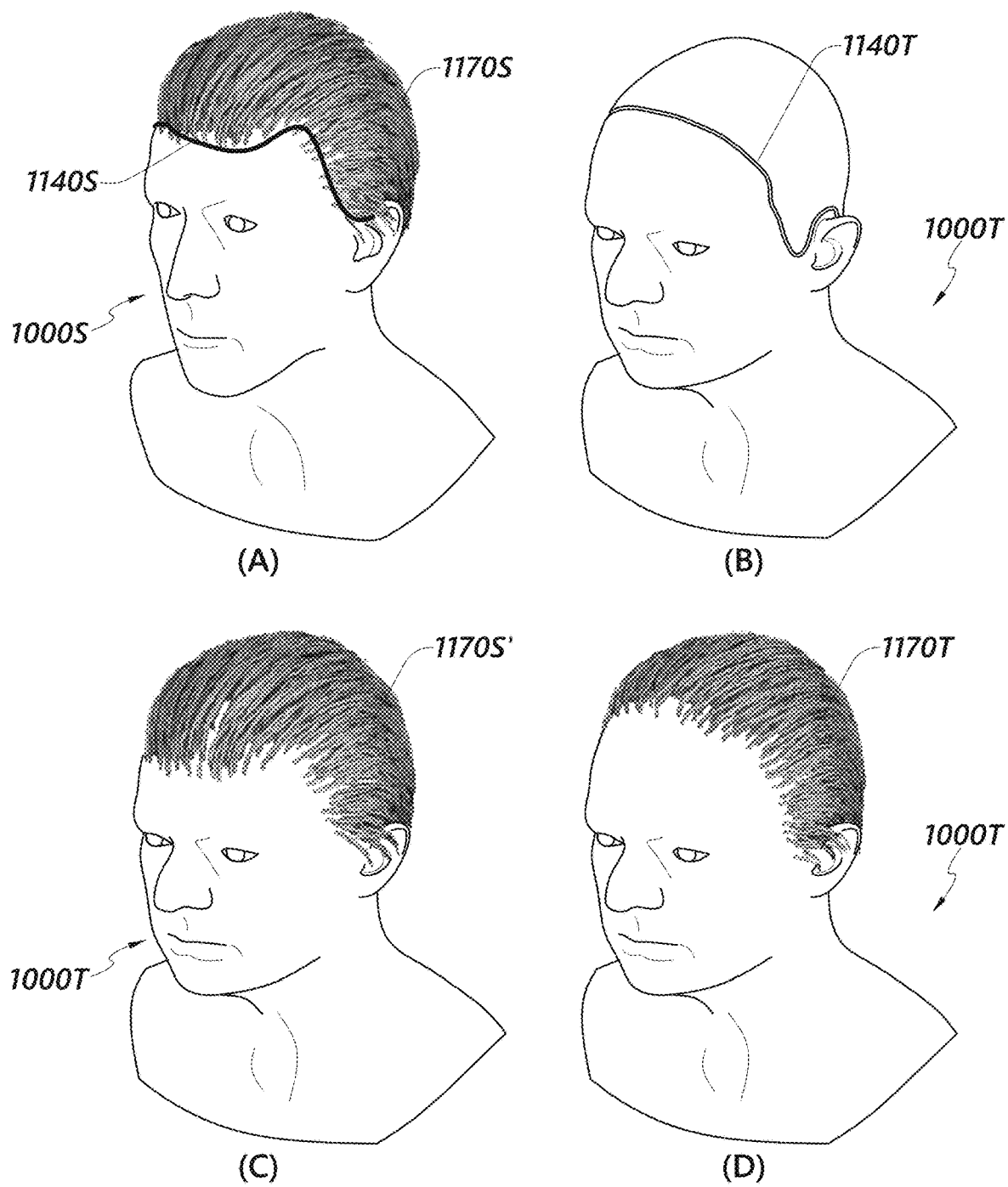
FIG. 12 illustrates an example of transferring a hair groom from a source (first) avatar to a target (second) avatar, factoring in hairline differences between the source and the target avatars. The source and target avatars, the hair groom, and the hairlines shown in FIG. 12 are intended to be illustrative and not limiting.

Overview of Transfer of a Hair Groom for a Source Virtual Avatar to a Target Virtual Avatar FIG. 12 schematically illustrates an example of transferring a hair groom 1170S generated for an example of a source avatar 1000S to an example of a target avatar 1000T. Additional details for the hair transfer technique are provided below with reference to FIG. 13.

Panel (A) shows the source avatar 1000S and its hair groom 1170S. The source avatar 1000S has a source hairline 1140S. The source hair groom 1170S can include strand-based hair data comprising guide curves, instanced strands, a hair mask (e.g., representing a region where hair grows), and/or the source hairline. In some implementations, the source hairline 1140S can be automatically determined from the source hair data (e.g., from the source hair mask) via contour detection. In some cases, the source avatar 1000S comprises a high-definition, high-quality digital representation, with high-fidelity strand-based hair and is, in effect, used as a source model for generation of other avatars (such as the target avatar).

Panel (B) shows the target avatar 1000T. The target avatar 1000T can be represented by a mesh of vertices and may be generated by a person (e.g., an animator, 3D graphic artist, or 3D modeler) or from 3D photogrammetry of a target model. In some cases, the source and the target avatars can share the same vertex geometry and connectivity, which advantageously may make the hair transfer pipeline more efficient.

The target avatar 1000T has a target hairline 1140T. In some implementations, the desired target hairline 1140T is created manually by a person (e.g., an animator, 3D graphic artist, or 3D modeler). In other implementations, other techniques can be used (e.g., a hair mask could be generated and then contour detection could determine the target hairline). Note the difference in the shapes and positions on the head (particularly the forehead where hairlines are most visually apparent) of the source and target hairlines 1140S, 1140T in this illustration. For example, the target avatar 1000T has a much higher (or receding) hairline 1140T showing much more of the target avatar's forehead as compared to the source avatar 1000S.

Panel (C) shows the transfer of the source hair groom 1170S to the target avatar 1000T, without adjustment for the differences between the source and target hairlines 1140S, 1140T. The hair groom data for the source avatar 1000S is copied to the target avatar 1000S and, if needed, the vertices can be morphed to fit the mesh geometry of the target avatar 1000T. The hair groom shown in panel (C) is labeled as 1170S' to reflect that it is an intermediate state shown for illustrative purposes, prior to hairline adjustment. As can be seen from panel (C), the hair groom 1170S' extends farther down the target avatar's forehead than its desired target hairline 1140T. This type of copying of the source hair groom 1170S to the target avatar 1000T does not provide the appropriate visual appearance for the target avatar 1000T.

Panel (D) shows the final hair groom 1170T of the target avatar 1000T after adjustment of the intermediate hair groom 1170S' to reflect the target avatar's actual hairline 1140T. Such an adjustment of the hair groom to account for hairline differences is sometimes referred to as a hairline morph. As can be seen from panel (D), the hairline of the intermediate hair groom 1170S' has been shifted to the position of the desired, target hairline 1140T. The transferred hair groom data (e.g., guide curves, hair mask, etc.) can be stored and used by a rendering engine to render the target avatar 1000T with the hair groom 1170T.

In this example, the differences between the source and target hairlines 1140S, 1140T are large to illustrate an overview of the hair transfer process, with hairline adjustment. For other avatars, the hairline differences may be less different and the visual distinction between them may be more subtle. Nonetheless, adjusting for hairline differences may provide a more realistic look to avatars, as even subtle visual differences can be readily identified by human viewers.

Additional details of the hair transfer and hairline morphing process will now be described.

Figure 13:
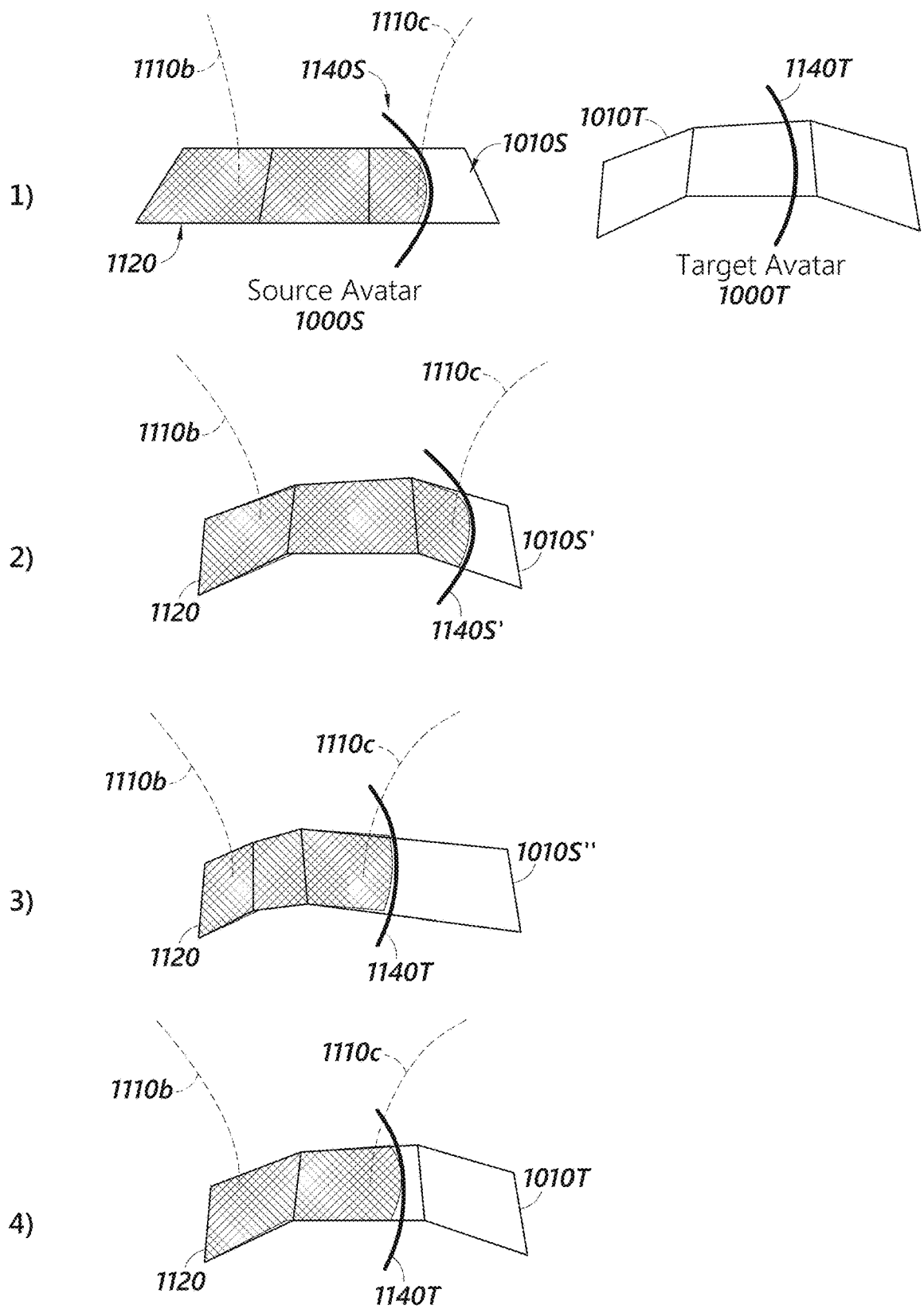
FIG. 13 illustrates an example of morphing a mesh and hairline for a source avatar to a target avatar.

Example Transfer of a Hair Groom for a Source Virtual Avatar to a Target Virtual Avatar FIG. 13 illustrates an example of morphing a mesh and hairline generated for a source avatar to a target avatar. Panel (1) shows a portion of a source mesh 1010S and source hairline 1140S for the source avatar 1000S. Panel (1) also shows a portion of a target mesh 1010T and target hairline 1140T for the target avatar 1000T. Note the difference in the shape and position (relative to the mesh) of the source and target hairlines 1140S, 1140T as well as the difference in shape of the source and target meshes 1010S, 1010T. Although the portions of the meshes 1010S, 1010T shown in FIG. 13 include three polygonal regions (e.g., quadrilaterals), this is for simplicity of illustration of the transfer technique and is not limiting. In practice, the regions of the source or target mesh where hair is to be transferred include many polygonal regions (e.g., many vertices of the respective meshes).

The hair groom (e.g., strand-based hair) for the source avatar 1000S has been previously generated and includes source hair groom data including, e.g., positions of the guide curves 1110b, 1110c and a hair mask 1120 (e.g., the region on the mesh where hair is to be generated, sometimes referred to as a UV mask or uvmap). Although FIG. 13 shows two example guide curves 1110b, 1110c, these are for illustration and not limitation (e.g., more or fewer guide curves may be used, guide curves may have different shapes or properties, etc.), and the hair groom data could include positions (or properties) of instanced strands as an alternative to or in addition to guide curves. The guide curves 1110b, 1110c (or instanced strands) can be attached to the source mesh 1010S, and the hair mask 1120 can be applied to (e.g., "painted on") the source mesh 1010S. For example, positions of the roots of the guide curves or strands are known relative to vertices of the mesh 1010S. Note that the target avatar 1000T is not shown with hair groom data, because, at the stage of panel (1), the target avatar 1000T may not have hair groom data (e.g., hair transfer has not yet occurred).

Panel (2) shows a vertex morph that shifts the positions of vertices of the source avatar mesh 1010S to match the positions of vertices of the target avatar's mesh 1010T, resulting in a morphed source mesh 1010S'. Only the morphed source avatar mesh is shown in panels (2) and (3), whereas panel (4) shows the target avatar mesh. In the vertex morph, the source mesh 1010S is morphed to fit the geometry of the target mesh 1010T, and the locations of the guide curves 1110b, 1110C (or strands), the hair mask 1120, and the hairline 1140S' follow based on the morph of the vertices. For example, during the morph, positions of the vertices for the source mesh 1010S are transformed to positions of the vertices of the target mesh 1010T to generate the morphed source mesh 1010S'. If a root of a guide curve or hair strand or a point in the hair mask or hairline is located between multiple vertices (e.g., between 4 vertices for the quadrilaterals shown in FIG. 13), then the root or point can maintain its position relative to these multiple vertices during the morph transformation. As an example, the position of the root or point can be represented as a weighted position relative to the neighboring vertices (e.g., the vertices of the quadrilateral shown in FIG. 14 in which the root or point is contained) so that the root or the point maintains its relative position to the transformed vertices after the morph, because the weights may not be changed during the morph.

In certain implementations, the mesh topology between the source and target avatars is the same. For example, the same number of vertices and the same geometry or connectivity of vertices can be used for all avatars. Having a standard mesh topology for all avatars in a production pipeline can be advantageous, because then any avatar can be readily morphed to any other avatar. However, having a standard mesh topology across all avatars is not required, and the techniques described herein can be used if the mesh topologies of the source and target avatars are different. If the source and target mesh topologies are different, the transfer process at panel (2) can morph source to target vertices using, e.g., closest-point-on surface techniques, a wrap deformer, UV mapping, etc.

Note that after the vertex morph, the hairline 1140S' in panel (2) is still representative of the source hairline 1140S and is different from the desired target hairline 1140T (e.g., compare the hairline 1140S' in panel (2) to the target hairline 1140T in panel (1)). For example, the position of the source hairline 1140S' is farther to the right (relative to the target mesh 1010T) than the desired position for the target hairline 1140T.

Accordingly, at panel (3), a hairline morph is performed in which the source hairline 1140S' is morphed to match the hairline 1140T of the target avatar. In the example shown in FIG. 13, it can be seen that the source hairline 1140S' from panel (2) has been moved to the left in panel (3) to match the desired position of the target hairline 1140T. This hairline morph can cause the mesh 1010S' shown in panel (2) to deform to mesh 1010S" shown in panel (3). In the example shown in FIG. 13, the hairline morph results in the left quadrilateral of the source mesh 1010S' being compressed, the middle quadrilateral of the source mesh 1010S' being shifted left and compressed, and the rightmost quadrilateral of the source mesh 1010S' being stretched. Thus, the source mesh 1010S' is deformed to a deformed source mesh 1010S" under the hairline morph. Also as can be seen from FIG. 13, during the hairline morph, the positions of the guide curves 1110b, 1110c (or strands) and the hair mask 1120 are transformed as the hairline is shifted. Although in this example the hairline morph shifted the source hairline leftward, this is for illustration and is not a limitation. In other hairline morphs, the hairline can be shifted rightward, or can remain in its same position (e.g., if the source and target hairlines match in a particular set of mesh polygons).

Also note that during the hairline morph the guide curves or strands and the hair mask can be shifted, e.g., to follow the morph of the vertices that matches the source and target hairlines.

Thus, the hairline morph can shift, stretch, or compress polygons of the mesh (e.g., compare the mesh 1010S" to the mesh 1010S'). Since the hairline morph is designed to morph the source hairline to the target hairline, it is generally desirable that mesh polygons that are more distant from the hairline regions are not substantially affected by the hairline morph. For example, the visual appearance of the hair might be reduced if hair at the crown or back of the head were simply shifted by the same amount as the hairlines. Thus, optionally, some implementations apply a falloff to the hairline morph, in which mesh regions farther from the hairline are relatively less affected by the hairline morph. For example, the falloff can be a linear, power law, exponential, or other suitable function of the distance from the hairline. Using falloff can advantageously improve the likelihood that the hair transfer in regions more distant from the hairline (e.g., the crown or back of the head, regions greater than 10 cm or so from the hairline, etc.) maintains a natural and realistic appearance after the morph. Note that falloff is not apparent from FIG. 13 because of the small number of mesh polygons used to illustrate hairline morph near the hairline in this example.

The deformed meshes 1010S' and 1010S" represent intermediate stages of the transfer process. Note that the deformed mesh 1010S" in panel (3) looks different from the desired target mesh 1010T shown in panel (1) due to the shifting/stretching/compressing that occurs during the hairline morph. Therefore, as shown in panel (4), the guide curves (or strands) 1110b, 1110c and the hair mask 1120 can be remapped to the original, undeformed target mesh 1010T for the target avatar 1000T. This advantageously avoids the hairline morph causing a permanent mesh deformation for the target avatar 1000T, which could change the target avatar's appearance from what is desired.

In the remapping shown in panel (4), the positions of the guide curves, strands, and hair mask are the same as in panel (3), however, their position relative to the mesh has changed. For example, the guide curve 1110c was attached to the rightmost polygon of the morphed mesh 1010S" in panel (3), but after the remapping, the guide curve 1110c is attached to the middle polygon of the undeformed mesh 1010T. The hairline 1140T passes through the middle polygon as desired (compare with panel (1)). The remapping can be performed by resampling the positions of the guide curves (or strands) and hair mask (or hairline) onto the undeformed target mesh 1010T.

At the stage of panel (4), the hair groom generated for the source avatar 1000S has been transferred to the target avatar 1000T accounting for the hairline differences between the source and target avatars. The hair groom data (e.g., positions of guide curves or strands, hair mask, hairline, etc.) for the target avatar 1000T can be stored (e.g., in non-transitory computer storage), communicated to an avatar rendering system (e.g., the avatar processing and rendering system 690), etc. The hair groom data for the target avatar 1000T can be used to render realistic and natural looking hair for the target avatar 1000T (see, e.g., the example hair groom 1170T shown in FIG. 12, panel (D)).

Figure 14:
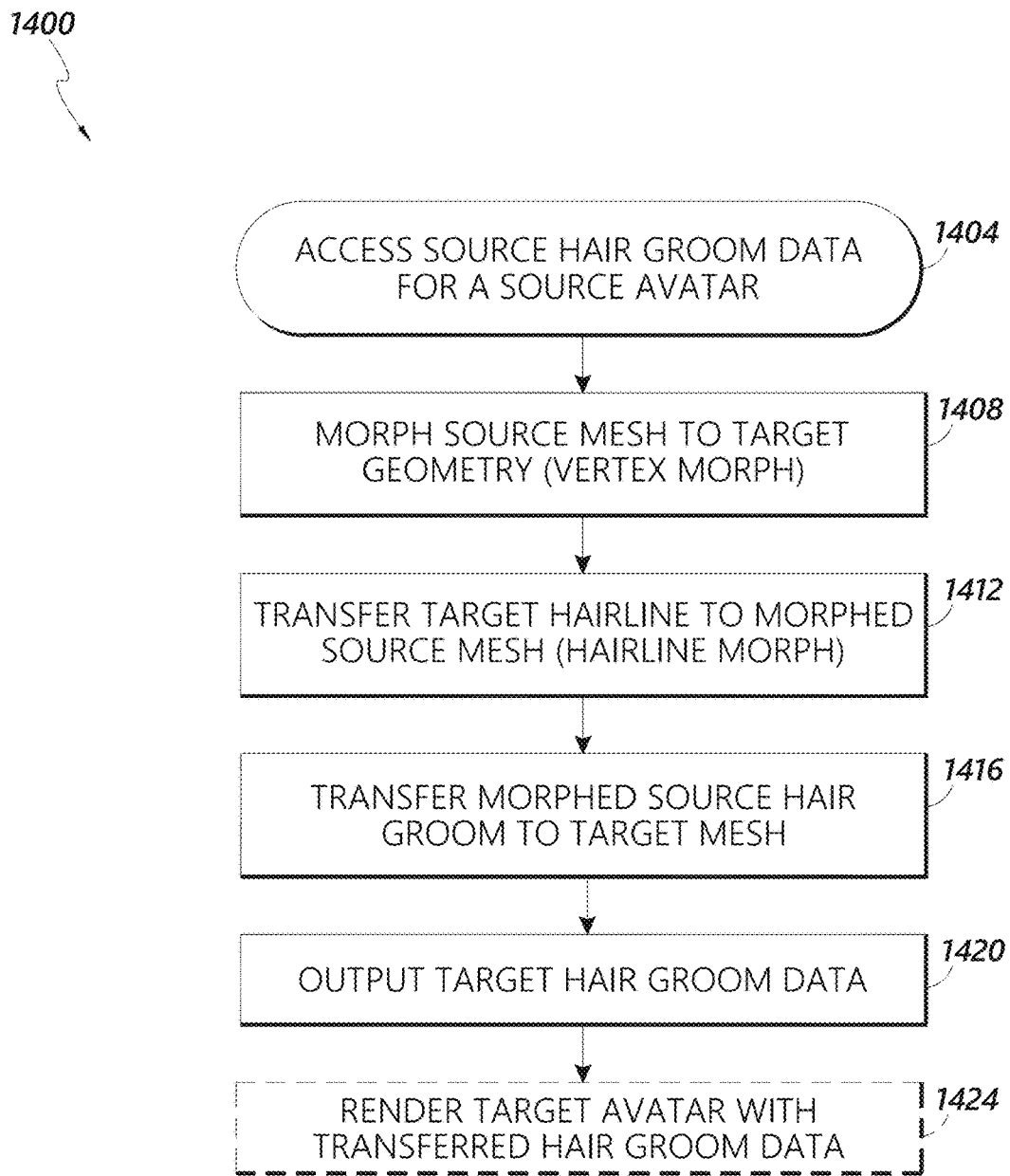
FIG. 14 is a flowchart that illustrates an example process for transferring hair groom data from a source avatar to a target avatar.

Example Processes for Transferring Hair Groom Data from a Source Avatar to a Target Avatar FIG. 14 is a flowchart that illustrates an example process 1400 for transferring hair groom data from a source avatar to a target avatar. The example process 1400 can be performed by one or more computing systems including the remote processing module 270, the local processing and data module 260, the avatar processing and rendering system 690 of FIG. 6B, the remote computing system 920 of FIG. 9A, other suitable hardware computing device(s), and combinations of these and other computing devices.

At block 1404, the process 1400 accesses source hair data that has been generated for a source avatar. The source hair data can comprise strand-based hair data that can include information on the guide curves or strands and a hair mask defining a region on the source avatar where the virtual hair is to be generated. The strand-based hair data can include information on a source hairline. The process 1400 can access a source mesh for the source avatar. The source mesh may comprise the mesh associated with the source avatar's head or optionally may include portions of the mesh associated with other portions of the source avatar's body. The process 1400 can access a target mesh for the target avatar. The target mesh may comprise the mesh associated with the target avatar's head or optionally may include portions of the mesh associated with other portions of the target avatar's body.

At block 1408, the process 1400 morphs the source mesh to the geometry of the target mesh (see, e.g., panel (2) of FIG. 13). As described herein, block 1408 can perform a vertex morph, in which a source mesh for the source avatar is morphed to fit the geometry of a target mesh of the target avatar, and the locations of the guide curves (or strands), the hair mask, and the morphed hairline 1140S' follow based on the morph of the vertices. For example, during the morph, positions of the vertices for the source mesh are transformed to positions of the vertices of the target mesh, and the positions of roots of the guide curves or strands or points on the source hairline or source hair mask follow based on their weighted positions relative to the vertices. In some implementations, the source and target meshes share the same topology and vertex connectivity, which can increase the efficiency of the hair groom transfer. However, if the source and target mesh topologies are different, the morph process at block 1408 can morph source to target vertices using, e.g., closest-point-on surface techniques, a wrap deformer, UV mapping, etc. At block 1408, the transformed hairline 1140S' will (generally) not match the desired hairline 1140T of the target avatar 1000T.

Accordingly, at block 1412, a hairline morph is performed to adjust the hair groom to account for the (generally) different hairline of the target avatar relative to the source avatar. For example, to transfer the target hairline to the morphed mesh (generated at block 1408), the source mesh can be further deformed to align the position of the target hairline to match the desired position relative to the target avatar. See, e.g., panel (3) of FIG. 13. A falloff can be applied so that mesh vertices in regions farther away from the hairline (e.g., the crown or back of the head) are relatively less affected by the hairline morph (than regions near the hairline), which advantageously keeps the hair groom in these relatively more distant regions looking natural and realistic.

Because the hairline morph performed at block 1412 can further deform the source mesh (e.g., from the mesh 1010S' to the mesh 1010S"), at block 1416, the process 1400 remaps the hair groom data onto the original, undeformed target mesh of the target avatar. For example, the positions of the guide curves (or strands) and hair mask (or hairline) can be resampled onto the undeformed target mesh 1010T. This advantageously avoids the hairline morph causing a permanent mesh deformation for the target avatar, which could change the target avatar's appearance from what is desired. The hair groom of the source avatar has thus been transferred to the target avatar, accounting for the hairline differences between the source and target avatars.

At block 1420, the process 1400 outputs the hair groom data for the target avatar, for example, to non-transitory storage. At optional block 1424, a real-time rendering system (e.g., the wearable system 200) can access the target hair groom data output at block 1420 and render the target avatar using the target hair groom data. The real-time rendering system is, in many cases, a different system than the system that performs blocks 1404 to 1420 of the process 1400. For example, with reference to FIG. 9A, source to target hair transfer can be performed by the remote computing system 920 (e.g., in the cloud), and the target hair groom data (e.g., output at block 1420) can be communicated, via the network 990, to individual wearable devices 930b, 930c or another display system 930a for real-time rendering of the target avatar.

The example process 1400 is illustrative of the hair groom transfer process. In other implementations, the hair groom transfer process can be performed differently. For example, the source hair groom can be copied to the target mesh, where the vertex morph and hairline morph can be performed to adjust the source and target hairlines. Since this process will morph the target mesh away from the original target mesh, a remapping of the hair groom (e.g., guide curves, strands, hair mask, etc.) onto the undeformed, original target mesh can be performed (e.g., similar to that described with reference to panel (4) of FIG. 13). Further, although described herein for transfer of strand-based hair, embodiments of the process 1400 can be used to access polygon strip (poly strip) hair data (at block 1404) and transfer the poly strip hair groom from a source avatar to a target avatar. For example, rather than adjusting positions of hair strands or guide curves in the vertex morph or the hairline morph, roots of poly strips can be adjusted. Many variations are possible.

Additional Aspects

1. A system comprising: non-transitory computer storage configured to store: source hair groom data for rendering hair of a source virtual avatar, the source hair groom data comprising information on strands indicative of shapes of strands of hair and a hair mask indicative of a region on the head of the source virtual avatar where hair is to be generated, the source hair groom data further comprising information on a source hairline; a source mesh for the source virtual avatar; a target mesh for a target virtual avatar; and a target hairline for the target virtual avatar; and a hardware processor in communication with the non-transitory computer storage, the hardware process programmed to: morph the source mesh to geometry representative of the target mesh of the target virtual avatar to provide a morphed source mesh; transfer the target hairline to the morphed source mesh to account for a difference between the target hairline and the source hairline to provide hairline-adjusted hair groom data; transfer the hairline-adjusted hair groom data onto the target mesh for the target virtual avatar to provide target hair groom data; and output the target hair groom data.

2. The system of aspect 1, wherein the source hair groom data comprises strand-based hair.

3. The system of aspect 1 or aspect 2, wherein the source mesh and the target mesh have the same mesh geometry.

4. The system of any one of aspects 1 to 3, wherein to morph the source mesh to geometry representative of the target mesh of the target virtual avatar, the hardware processor is programmed to transform a position of a root of a strand or a point in the hair mask to maintain the position of the root or the point relative to vertices of the morphed source mesh.

5. The system of any one of aspects 1 to 4, wherein to morph the source mesh to geometry representative of the target mesh of the target virtual avatar, the hardware processor is programmed to morph vertices of the source mesh to vertices of the target mesh via a closest-point-on surface technique, a wrap deformer, or a UV mapping.

6. The system of any one of aspects 1 to 5, wherein to transfer the target hairline to the morphed source mesh to account for a difference between the target hairline and the source hairline, the hardware processor is programmed to shift vertices of the morphed source mesh to shift a position of a transformed hairline to a position of the target hairline.

7. The system of any one of aspects 1 to 6, wherein to transfer the target hairline to the morphed source mesh to account for a difference between the target hairline and the source hairline, the hardware processor is programmed to apply a falloff.

8. The system of aspect 7, wherein the falloff reduces a shift in vertices of the morphed source mesh based at least partly on increasing distance from the target hairline.

9. The system of any one of aspects 1 to 8, wherein to transfer the hairline-adjusted hair groom data onto the target mesh for the target virtual avatar, the hardware processor is programmed to remap positions of the strands or the hair mask in the hairline-adjusted hair groom data onto the target mesh for the target virtual avatar.

10. The system of any one of aspects 1 to 9, wherein the hardware processor is further programmed to accept user input to provide the target hairline.

11. The system of any one of aspects 1 to 10, wherein the source virtual avatar or the target virtual avatar is a virtual representation of a human, an animal, a creature, or an object.

12. The system of any one of aspects 1 to 11, wherein to output the target hair groom data, the hardware processor is programmed to communicate the target hair groom data to a wearable display device.

13. The system of aspect 12, further comprising the wearable display device, and wherein the wearable display device is programmed to render hair of the target virtual avatar based at least partly on the target hair groom data.

14. A method comprising: under control of a three-dimensional (3D) animation engine comprising computing hardware: adjusting a source mesh for a source virtual avatar to a geometry representative of a target mesh of a target virtual avatar to provide an adjusted source mesh; transferring a target hairline of the target virtual avatar to the adjusted source mesh to account for a difference between the target hairline of the target avatar and a source hairline of the source avatar to provide hairline-adjusted hair groom data; transferring the hairline-adjusted hair groom data onto the target mesh for the target virtual avatar to provide target hair groom data; and outputting the target hair groom data.

15. The method of aspect 14, wherein adjusting the source mesh for the source virtual avatar to the geometry representative of the target mesh of the target virtual avatar comprises morphing vertices of the source mesh for the source virtual avatar based at least partly on vertices of the target mesh.

16. The method of aspect 15, wherein morphing vertices of the source mesh for the source virtual avatar onto vertices of the target mesh comprises applying a closest-point-on surface technique, a wrap deformer, or a UV mapping.

17. The method of any one of aspects 14 to 16, wherein transferring the target hairline of the target virtual avatar to the adjusted source mesh to account for the difference between the target hairline of the target avatar and the source hairline of the source avatar comprises shifting vertices of the adjusted source mesh to shift a position of a transferred hairline to a position of the target hairline.

18. The method of aspect 17, wherein shifting vertices of the adjusted source mesh comprises applying a falloff, wherein vertices of the adjusted source mesh farther from the target hairline are shifted less than vertices of the target mesh closer to the target hairline.

19. The method of any one of aspects 14 to 18, wherein outputting the target hair groom data comprises communicating the target hair groom data to a wearable display device.

20. The method of any one of aspects 14 to 19, further comprising rendering the target virtual avatar with the target hair groom data.

21. A method comprising: under control of a three-dimensional (3D) animation engine comprising computing hardware: accessing, for a first virtual character, a first mesh and first hair groom data comprising a first hairline; accessing, for a second virtual character, a second mesh and a second hairline; performing a vertex morph based at least partly on the first mesh and the second mesh to provide a first morphed mesh and first morphed hair groom data; performing a hairline morph to transfer the second hairline to the first morphed mesh to provide a second morphed mesh and second morphed hair groom data; transferring the second morphed hair groom data from the second morphed mesh to the second mesh to provide second hair groom data for the second virtual character; and outputting the second hair groom data.

22. The method of aspect 21, wherein the first mesh and the second mesh have the same mesh topology.

23. The method of aspect 21 or aspect 22, wherein the first hair groom data comprises data for a plurality of hair strands or a plurality of guide curves.

24. The method of any one of aspects 21 to 23, wherein the first hair groom data comprises a hair mask.

25. The method of any one of aspects 21 to 24, wherein performing a vertex morph comprises morphing vertices of a portion of the first mesh based at least partly on vertices of the second mesh.

26. The method of any one of aspects 21 to 25, wherein performing a vertex morph comprises applying a closest-point-on surface technique, a wrap deformer, or a UV mapping.

27. The method of any one of aspects 21 to 26, wherein performing the hairline morph comprises adjusting a position of a morphed hairline in the first morphed hair groom data based at least partly on a position of the second hairline.

28. The method of any one of aspects 21 to 27, wherein performing the hairline morph comprises applying a falloff in at least one portion of the first morphed away from the second hairline.

29. The method of any one of aspects 21 to 28, wherein transferring the second morphed hair groom data from the second morphed mesh to the second mesh to provide second hair groom data for the second virtual character comprises remapping positions of strands or a hair mask in the second morphed hair groom data onto the second mesh for the second virtual character.

30. A system comprising: a hardware processor in communication with non-transitory memory, the hardware processor programmed to: access, for a first virtual character, a first mesh and first hair groom data comprising a first hairline; access, for a second virtual character, a second mesh and a second hairline; perform a vertex morph based at least partly on the first mesh and the second mesh to provide a first morphed mesh and first morphed hair groom data; perform a hairline morph to transfer the second hairline to the first morphed mesh to provide a second morphed mesh and second morphed hair groom data; transfer the second morphed hair groom data from the second morphed mesh to the second mesh to provide second hair groom data for the second virtual character; and output the second hair groom data.

31. The system of aspect 30, wherein the first mesh and the second mesh have the same mesh topology.

32. The system of aspect 30 or aspect 31, wherein the first hair groom data comprises data for a plurality of hair strands or a plurality of guide curves.

33. The system of any one of aspects 30 to 32, wherein the first hair groom data comprises a hair mask.

34. The system of any one of aspects 30 to 33, wherein to perform a vertex morph, the hardware processor is programmed to: morph vertices of a portion of the first mesh based at least partly on vertices of the second mesh.

35. The system of any one of aspects 30 to 34, wherein to perform a vertex morph, the hardware processor is programmed to apply a closest-point-on surface technique, a wrap deformer, or a UV mapping.

36. The system of any one of aspects 30 to 35, wherein to perform the hairline morph, the hardware processor is programmed to adjust a position of a morphed hairline in the first morphed hair groom data based at least partly on a position of the second hairline.

37. The system of any one of aspects 30 to 36, wherein performing the hairline morph comprises applying a falloff in at least one portion of the first morphed away from the second hairline.

38. The system of any one of aspects 30 to 37, wherein to transfer the second morphed hair groom data from the second morphed mesh to the second mesh to provide second hair groom data for the second virtual character, the hardware processor is programmed to remap positions of strands or a hair mask in the second morphed hair groom data onto the second mesh for the second virtual character.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time. As another example, transferring hair groom data and adjusting for avatar hairline as described with reference to FIGS. 12 and 13 or the process 1400 described with reference to FIG. 14 can be computationally intensive.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   non-transitory computer storage configured to store:
      source hair groom data for rendering hair of a source virtual avatar, the source hair groom data comprising:
         information on strands indicative of shapes of strands of hair of the source virtual avatar,
         a hair mask indicative of a region on a head of the source virtual avatar where the strands of hair are to be generated, and
         information on a source hairline;
      a source mesh for the source virtual avatar; and
      a target mesh for a target virtual avatar; and
   a hardware processor in communication with the non-transitory computer storage, the hardware processor programmed to:
      morph the source mesh to geometry representative of the target mesh of the target virtual avatar to provide a morphed source mesh;
      generate target hair groom data based, at least in part, on the morphed source mesh; and
      output the target hair groom data.

2. The system of claim 1, wherein the source hair groom data comprises strand-based hair.

3. The system of claim 1, wherein the source mesh and the target mesh have the same mesh geometry.

4. The system of claim 1, wherein to morph the source mesh to geometry representative of the target mesh of the target virtual avatar, the hardware processor is programmed to transform a position of a root of a strand or a point in the hair mask to maintain the position of the root or the point relative to vertices of the morphed source mesh.

5. The system of claim 1, wherein to morph the source mesh to geometry representative of the target mesh of the target virtual avatar, the hardware processor is programmed to morph vertices of the source mesh to vertices of the target mesh via a closest-point-on surface technique, a wrap deformer, or a UV mapping.

6. The system of claim 1, wherein the hardware processor is further programmed to:
   accept a user input to provide a target hairline for the target virtual avatar; and
   transfer the target hairline to the morphed source mesh to account for a difference between the target hairline and the source hairline to provide hairline-adjusted hair groom data.

7. The system of claim 6, wherein the hardware processor is further programmed to:
   transfer the hairline-adjusted hair groom data onto the target mesh for the target virtual avatar; and
   wherein the target hair groom data is based, at least in part, on the transferred hairline-adjusted hair groom data.

8. The system of claim 1, wherein the source virtual avatar or the target virtual avatar is a virtual representation of a human, an animal, a creature, or an object.

9. The system of claim 1, wherein to output the target hair groom data, the hardware processor is programmed to communicate the target hair groom data to a wearable display device.

10. The system of claim 9, wherein the wearable display device is programmed to render hair of the target virtual avatar based at least partly on the target hair groom data.

11. A method comprising:
    under control of a computing system executing software instructions:
       storing source hair groom data for rendering hair of a source virtual avatar, the source hair groom data comprising:
          information on strands indicative of shapes of strands of hair of the source virtual avatar,
          a hair mask indicative of a region on a head of the source virtual avatar where the strands of hair are to be generated, and information on a source hairline;
          a source mesh for the source virtual avatar; and
          a target mesh for a target virtual avatar;
       morphing the source mesh to geometry representative of the target mesh of the target virtual avatar to provide a morphed source mesh;
       generating target hair groom data based, at least in part, on the morphed source mesh; and
       outputting the target hair groom data.

12. The method of claim 11, wherein the source hair groom data comprises strand-based hair.

13. The method of claim 11, wherein the source mesh and the target mesh have the same mesh geometry.

14. The method of claim 11, further comprising transforming a position of a root of a strand or a point in the hair mask to maintain the position of the root or the point relative to vertices of the morphed source mesh.

15. The method of claim 11, further comprising morphing vertices of the source mesh to vertices of the target mesh via a closest-point-on surface technique, a wrap deformer, or a UV mapping.

16. The method of claim 11, further comprising:
    accepting a user input to provide a target hairline for the target virtual avatar; and
    transferring the target hairline to the morphed source mesh to account for a difference between the target hairline and the source hairline to provide hairline-adjusted hair groom data.

17. The method of claim 16, further comprising:
    transferring the hairline-adjusted hair groom data onto the target mesh for the target virtual avatar, wherein the target hair groom data is based, at least in part, on the transferred hairline-adjusted hair groom data.

18. The method of claim 11, wherein the source virtual avatar or the target virtual avatar is a virtual representation of a human, an animal, a creature, or an object.

19. The method of claim 11, further comprising communicating the target hair groom data to a wearable display device.

20. The method of claim 19, further comprising rendering hair of the target virtual avatar based at least partly on the target hair groom data.

\* \* \* \* \*